(12) United States Patent
Watanabe

(10) Patent No.: US 6,185,186 B1
(45) Date of Patent: Feb. 6, 2001

(54) FIXED-LENGTH CELL HANDLING SWITCHING SYSTEM AND A METHOD FOR CONTROLLING A READ RATE OF A FIXED-LENGTH CELL

(75) Inventor: Yoshihiro Watanabe, Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 08/966,202

(22) Filed: Nov. 7, 1997

(30) Foreign Application Priority Data

Nov. 18, 1996 (JP) .................................................. 8-306912
Apr. 18, 1997 (JP) .................................................. 9-102208

(51) Int. Cl.[7] .............................. H04L 12/26; H04L 12/56
(52) U.S. Cl. ........................ 370/232; 370/253; 370/395; 370/412; 370/465
(58) Field of Search .................................... 370/229, 230, 370/231, 232, 235, 252, 253, 389, 395, 412, 465, 477

(56) References Cited

U.S. PATENT DOCUMENTS 5,365,519 * 11/1994 Kozaki et al. ........................ 370/395
5,519,689 * 5/1996 Kim ..................................... 370/253
5,555,265 * 9/1996 Kakuma et al. ...................... 370/395
5,583,857 * 12/1996 Soumiya et al. ..................... 370/233
5,689,508 * 11/1997 Lyles ................................... 370/391
5,818,818 * 10/1998 Soumiya et al. ..................... 370/252

FOREIGN PATENT DOCUMENTS 7-240752 * 9/1995 (JP) .

* cited by examiner

Primary Examiner—Alpus H. Hsu
(74) Attorney, Agent, or Firm—Helfgott & Karas, P.C.

(57) ABSTRACT

The invention relates to a fixed-length cell handling switching system and a method for controlling a read rate of a fixed-length cell. The fixed-length cell handling switching system has a quality class identifier relating unit for relating a quality class identifier according to a quality class of a cell, a quality controlling buffer unit including a managing unit, a buffer and a read rate information holding unit, and a call handling control unit including a virtual band setting unit for setting a virtual band of the buffer and a read rate setting control unit for setting and controlling a read rate, wherein a read rate for each quality class is dynamically changed, whereby a transmitting process is conducted according to a required quality class without affecting fixed-length cells of calls having different qualities on each other.

21 Claims, 35 Drawing Sheets

FIG. 8

| QUALITY CLASS | VIRTUAL BAND | READ RATE |
|---|---|---|
| CLASS 0 | 100 Mbps | 200 Mbps |
| CLASS 1 | 200 Mbps | 200 Mbps |
| CLASS 2 | 300 Mbps | 500 Mbps |
| CLASS 3 | 400 Mbps | 600 Mbps |

FIG. 30
(a)
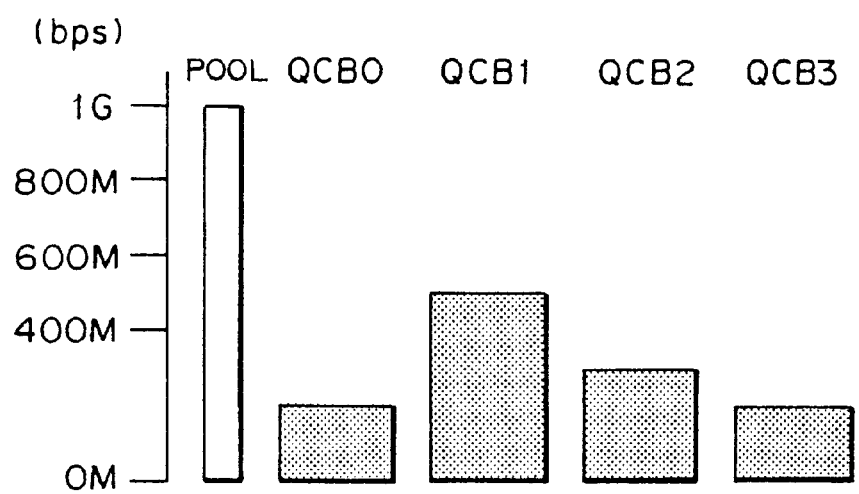
ADD 100 MBPS TO QCB1
(b)
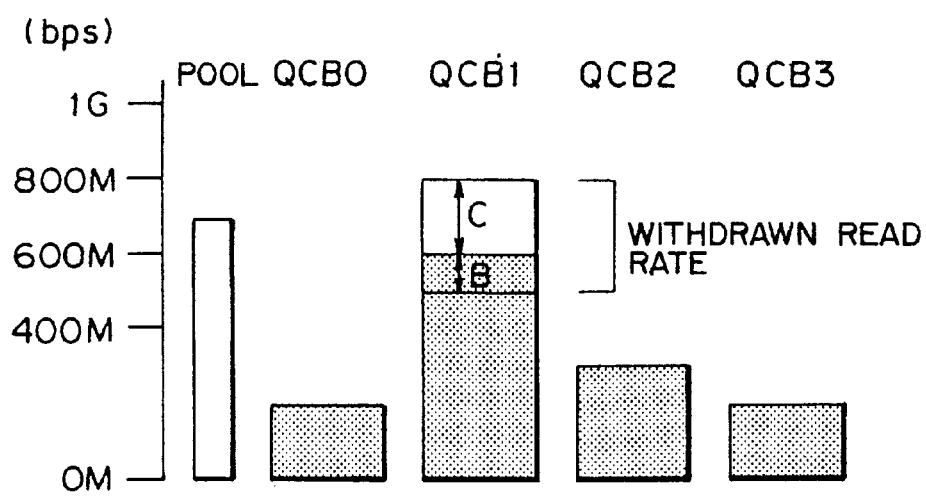

FIG. 31
(a)
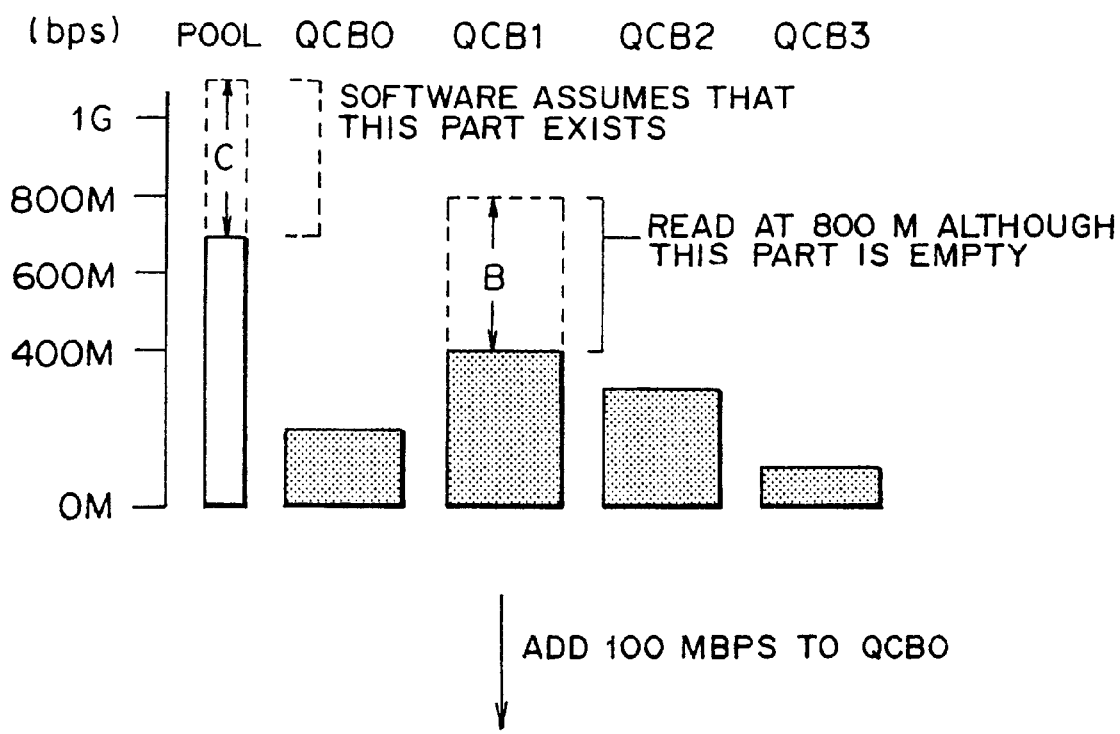
ADD 100 MBPS TO QCB0
(b)
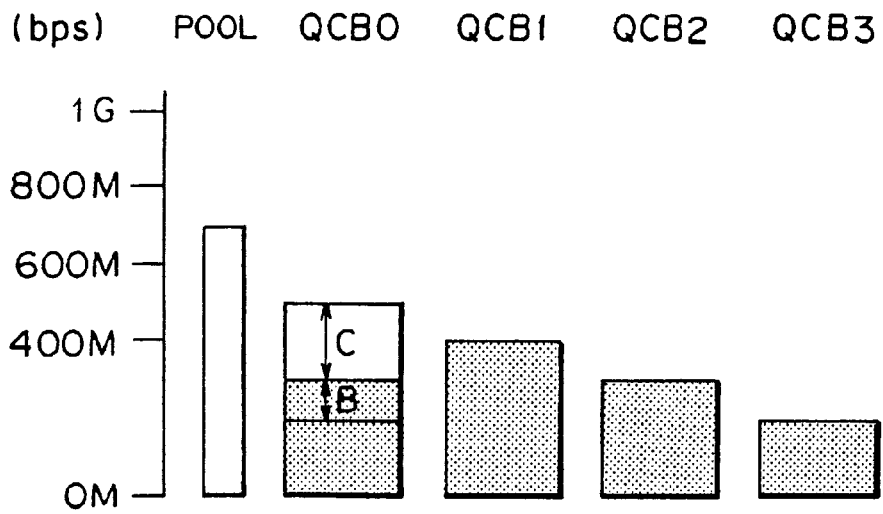

FIG. 33

| QUALITY CLASS | PCR SUM TOTAL | SCR SUM TOTAL | VIRTUAL BAND | READ RATE |
|---|---|---|---|---|
| QCB = 0 | 130M | 50M | 144M | 150M |
| QCB = 1 | 150M | 60M | 90M | 120M |
| QCB = 2 | 2000M | 50M | 100M | 120M |

FIXED-LENGTH CELL HANDLING SWITCHING SYSTEM AND A METHOD FOR CONTROLLING A READ RATE OF A FIXED-LENGTH CELL

BACKGROUND OF THE INVENTION

(1) Field of the Invention

The present invention relates to a system for dividing information that should be transferred into fixed-length cells and transferring the fixed-length cells, more specifically, to a fixed-length cell handling switching system and a method for controlling a read rate of a fixed-length cell suitable for use upon processing cells in various quality classes.

(2) Description of the Related Art

As a fixed-length cell handling switching system which handles fixed-length cells, there is an ATM switching system which switches, in particular, ATM (Asynchronous Transfer Mode) cells as fixed-length cells. ATM switching technique for applying such ATM switching system has been agreed as a next-generation switching system in ITU-T, and is being lively developed in various organizations as a technique which can realize wide-area ISDN (Integrated Services Digital Network).

The above ATM switching system uses an ATM cell which is a fixed length-cell of 53 octets as a unit for transferring information. The ATM cell has a header portion of 5 octets in which control information (destination, etc.) is stored and a data portion (payload) of 48 octets.

The ATM switching technique can transfer ATM cells asynchronously, and increase the number of ATM cells to be transferred in a given time when it is desired to transfer information at a high rate. On the other hand, when information is transferred at a low rate, the ATM switching technique decreases the number of ATM cells so as to readily regulate an information transmission rate.

By applying the above ATM switching technique, it is possible to uniformly handle information ranging from a low rate of several kbps such as voice data and the like to a high rate of several hundreds Mbps such as images and the like to transfer the information.

Since the ATM switching system handles communication services having various cell qualities such as voice, image, data, etc., a controlling system which can satisfy each quality and effectively make full use of resources of the switching system is required.

However, in a fixed-length cell handling switching system as the above ATM switching system, processes conducted in the switching system are complicated. For this, the above fixed-length cell handling switching system controls all media based on a service corresponding to data in the highest quality class among various services so that it is impossible to effectively use network resources.

In addition, since resources of the switching system are not divided in each quality class, cell discarding occurs depending on a state at that time irrespective of a grade of a quality if cell congestion occurs. Namely, congestion of cells in a low quality class may induce discarding of a cell in a high quality class. If cell congestion occurs in another communication, communication satisfying a required quality becomes impossible.

SUMMARY OF THE INVENTION

In the light of the above problem, an object of the present invention is to provide a fixed-length cell handling switching system and a method for controlling a read rate of a fixed-length cell, which can dynamically change a read rate of each quality class, thereby conducting a transmitting process according to a required quality class without affecting fixed-length cells of calls having different qualities on each other.

The present invention therefore provides a fixed-length cell handling switching system having a call handling control unit for controlling call handling when communication is made using a fixed-length cell comprising a quality class identifier relating unit for relating a quality class identifier according to a quality class of the fixed-length cell, a quality controlling buffer unit having a managing unit for managing the fixed-length cell related to the quality class identifier on the basis of the quality class identifier, a buffer for storing the fixed-length cell managed by the managing unit, and a read rate information holding unit for holding information about a read rate of the fixed-length cell stored in the buffer, the cell handling control unit comprising a virtual band setting unit for setting a virtual band in the buffer on the basis of the quality class and a declared band in a call presently set, and a read rate setting control unit for setting and controlling a read rate of the fixed-length cell held in the read rate information holding unit on the basis of the virtual band set by the virtual band setting unit.

The present invention also provides a fixed-length cell handling switching system comprising a quality class identifier relating unit for relating a quality class identifier to a fixed-length cell flowing in through a route of a set call on the basis of a quality class and a declared band when the call is set, a managing unit for managing a route of the fixed-length cell inputted from the quality class identifier relating unit on the basis of the quality class identifier related by the quality class identifier relating unit, a buffer for storing the fixed-length cell managed by the managing unit, and a read rate setting control unit for setting a virtual band of the buffer on the basis of the quality class-and the declared band and controlling a read rate for the fixed-length cell held in the buffer on the basis of the virtual band.

The present invention still also provides a method for controlling a read rate of a fixed-length cell stored in a buffer on the basis of a quality class of communication from the buffer comprising the steps of setting a virtual band of the buffer on the basis of the quality class and a declared band, relating a quality class identifier to a fixed-length cell flowing in through a route of a set call on the basis of the quality class of the communication and the declared band declared when the call is set, managing the fixed-length cell related to the quality class identifier on the basis of the quality class identifier and storing the fixed-length cell in the buffer, and relating the fixed-length cell stored in the buffer at a read rate determined on the basis of the virtual band.

According to the fixed-length cell handling switching system and the method for controlling a read rate of a fixed-length cell of this invention, it is possible to set and control each of fixed-length cells having different qualities to a read rate according to its quality. If there if a declaration exceeding a read rate having been set, the read rate may be readily and dynamically changed, and cell discarding and cell delay may be independently controlled in each quality class without affecting cells of calls having different qualities on each other. It is therefore possible to certainly switch a fixed-length cell to be transmitted according to a required quality class so as to largely improve a processing capability of the system.

BRIEF DESCRIPTION OF THE DRAWINS

FIG. 8 is a diagram showing an example of virtual bands and read rates set in a quality controlling buffer unit according to the embodiment;

Figure 12:
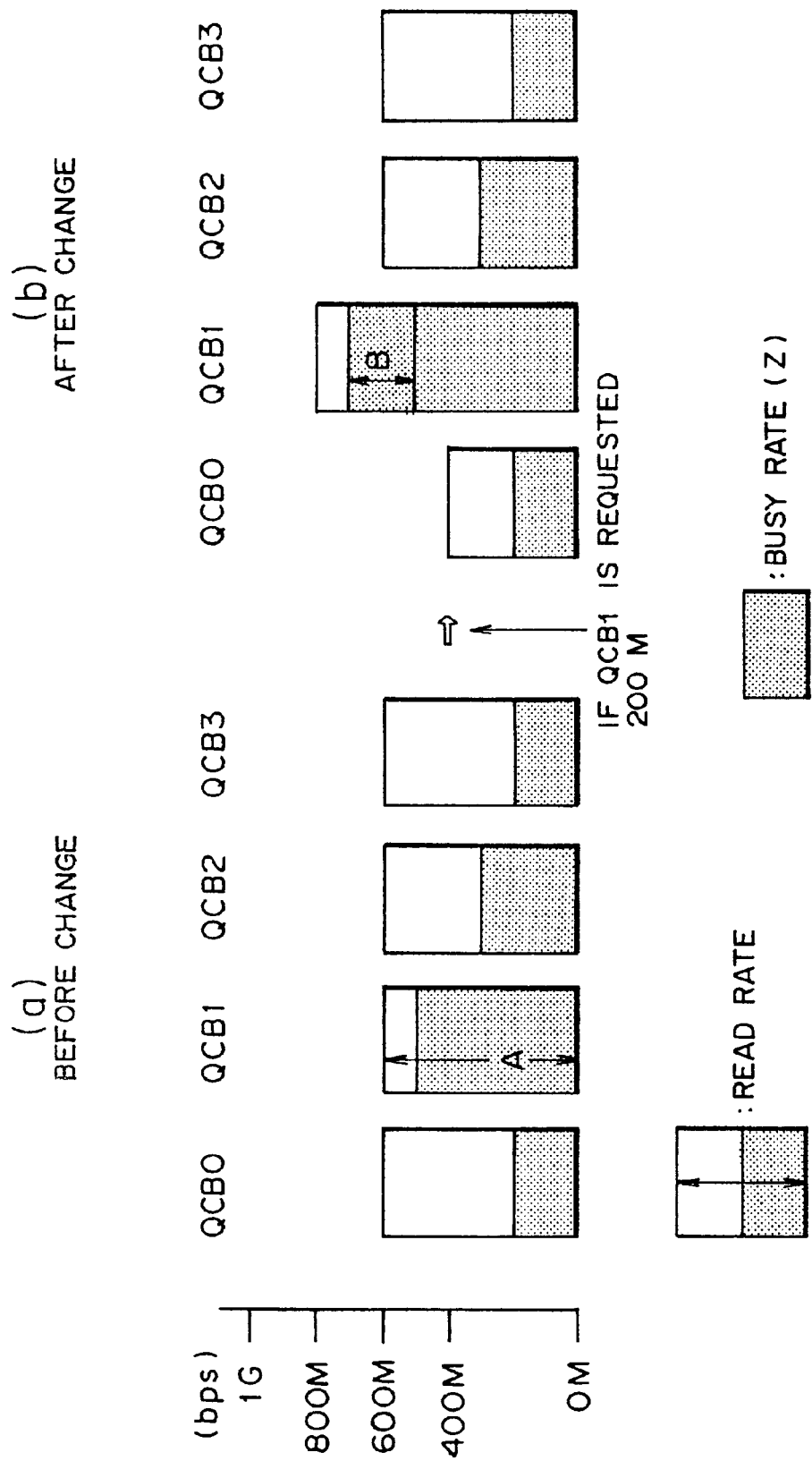
Figure 13:
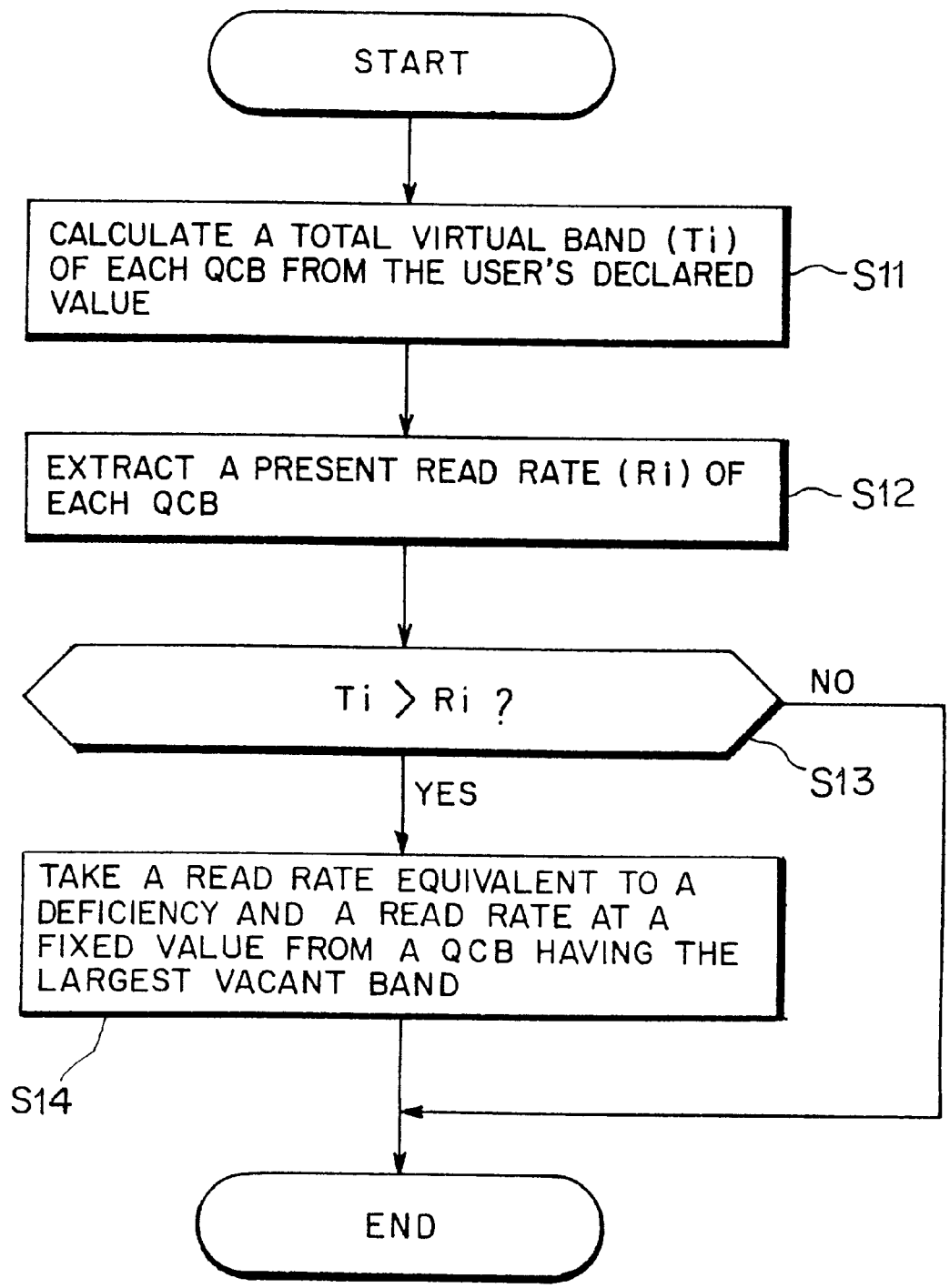
Figure 14:
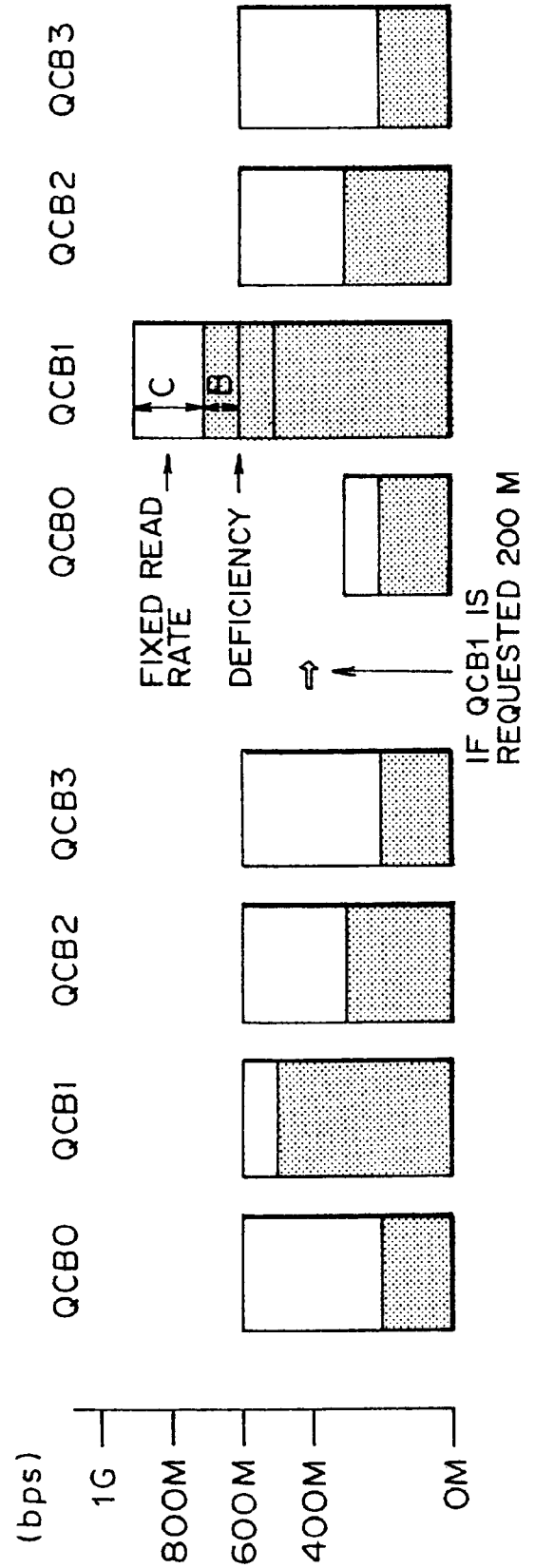
Figure 15:
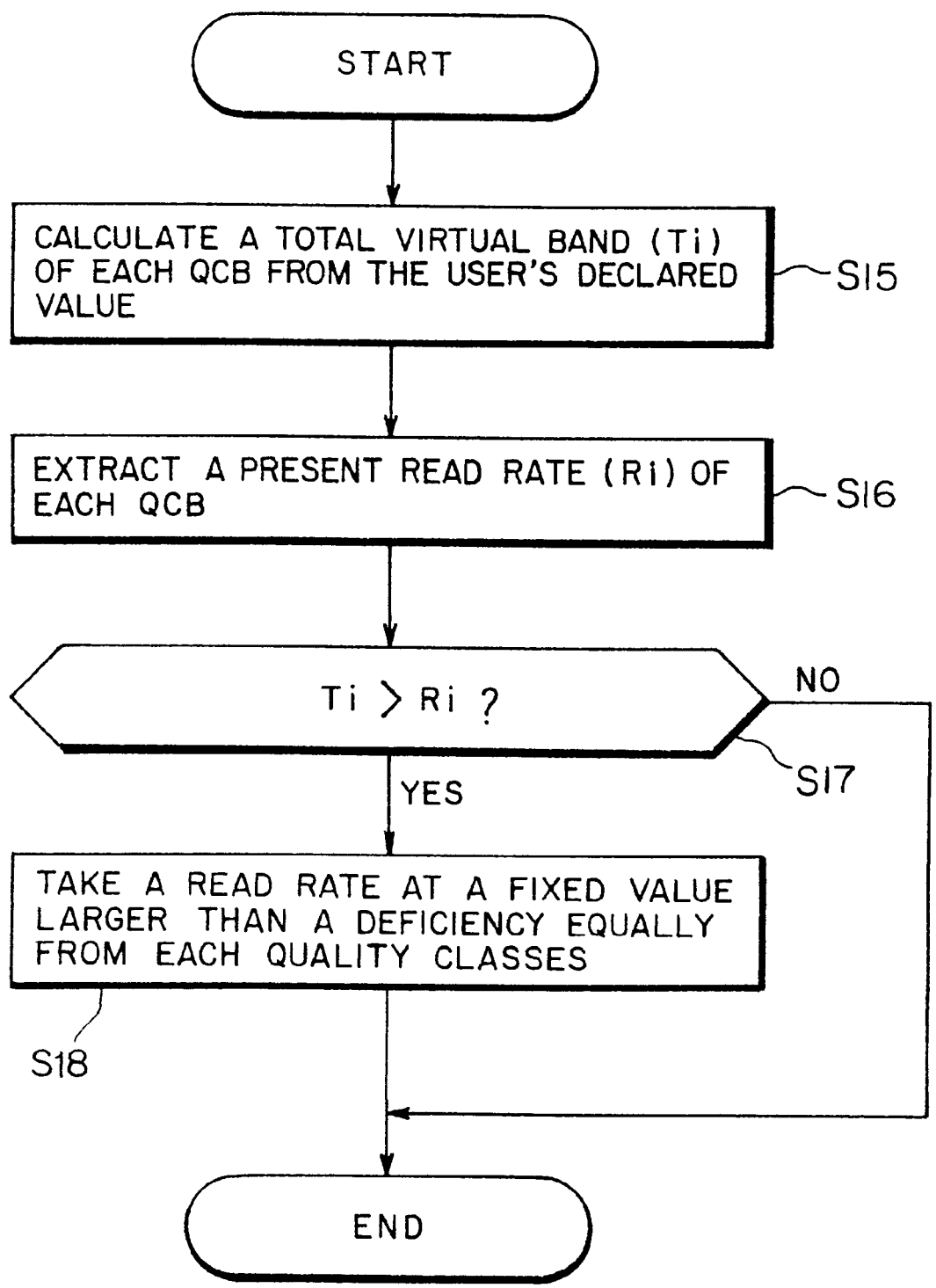
Figure 16:
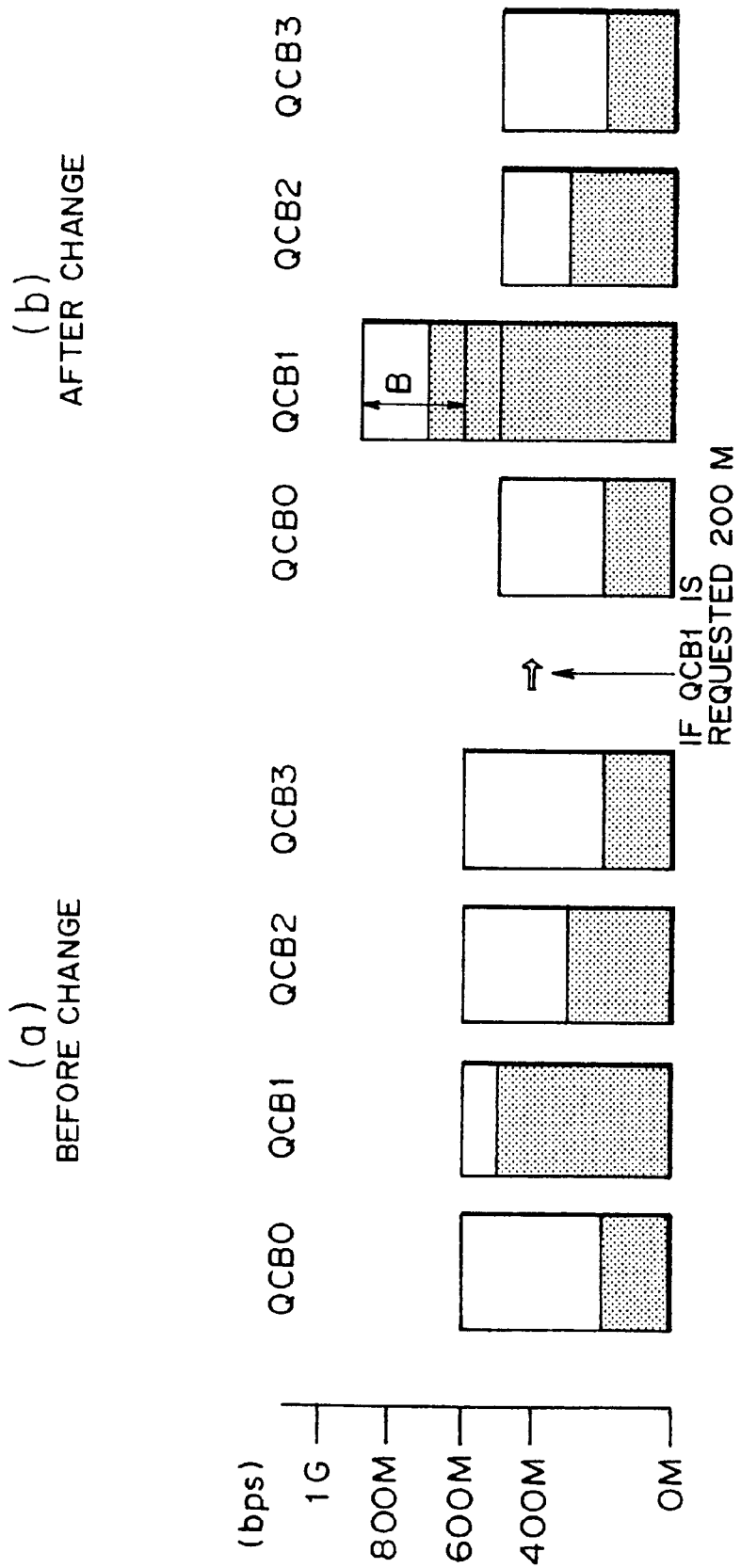
Figure 17:
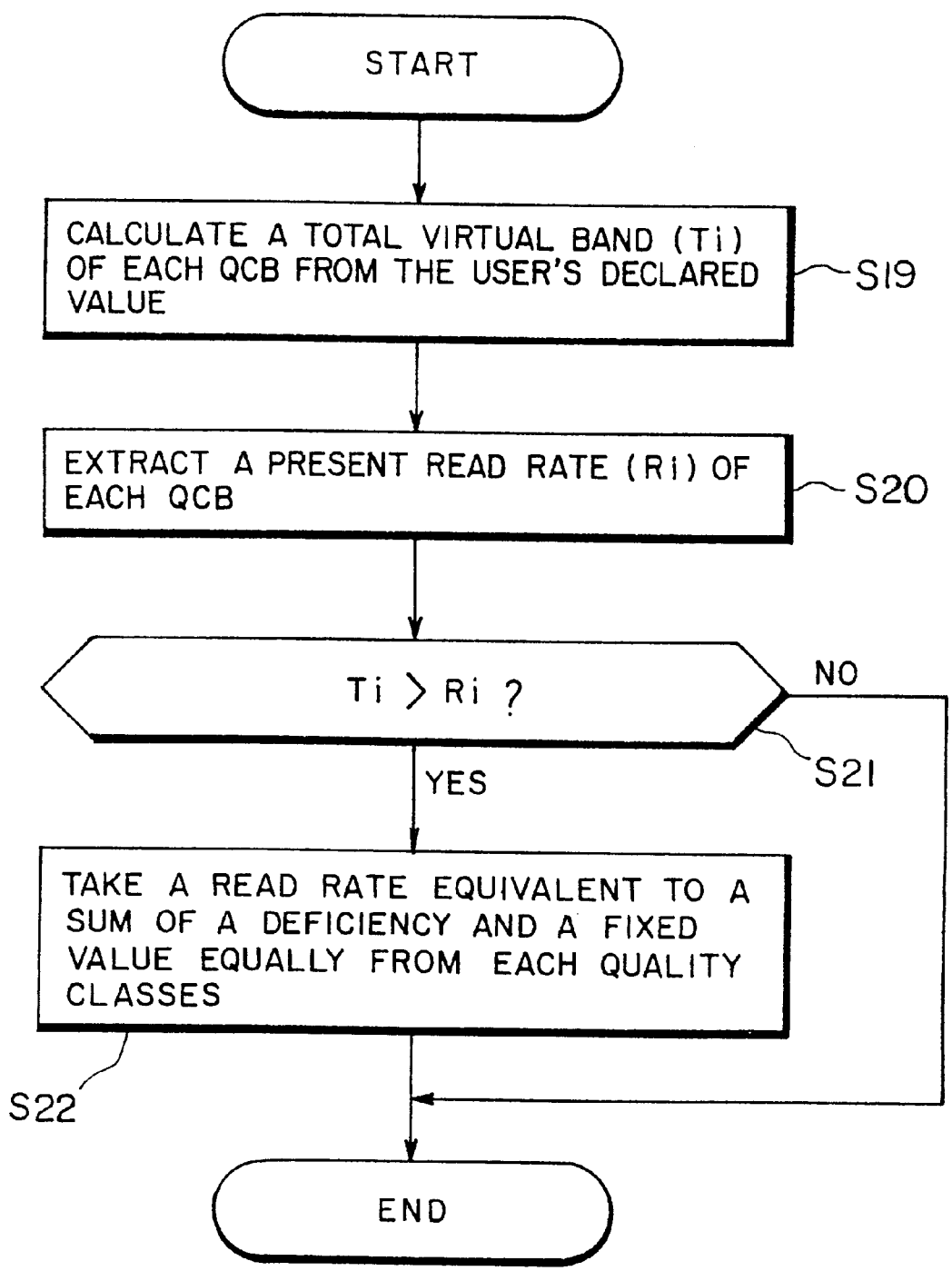
Figure 18:
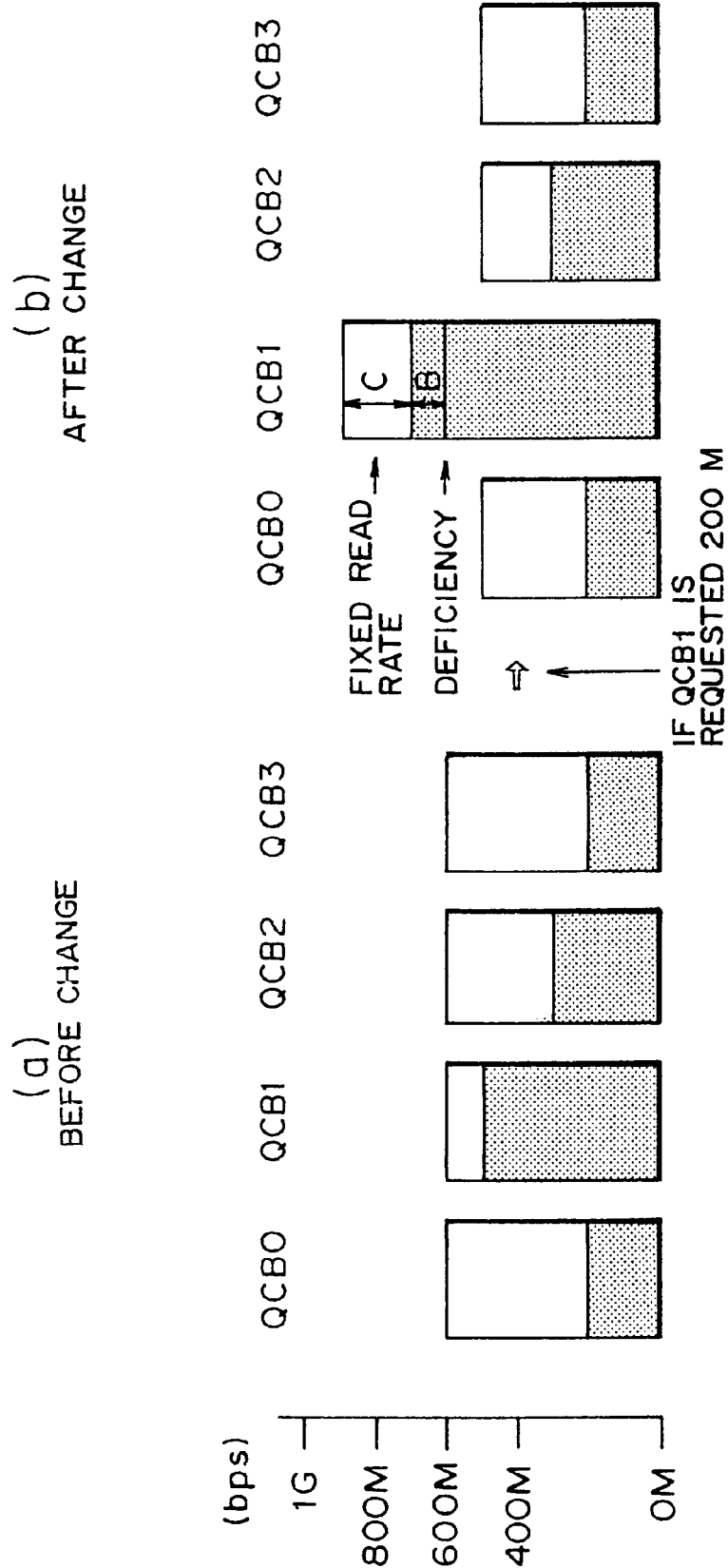
Figure 19:
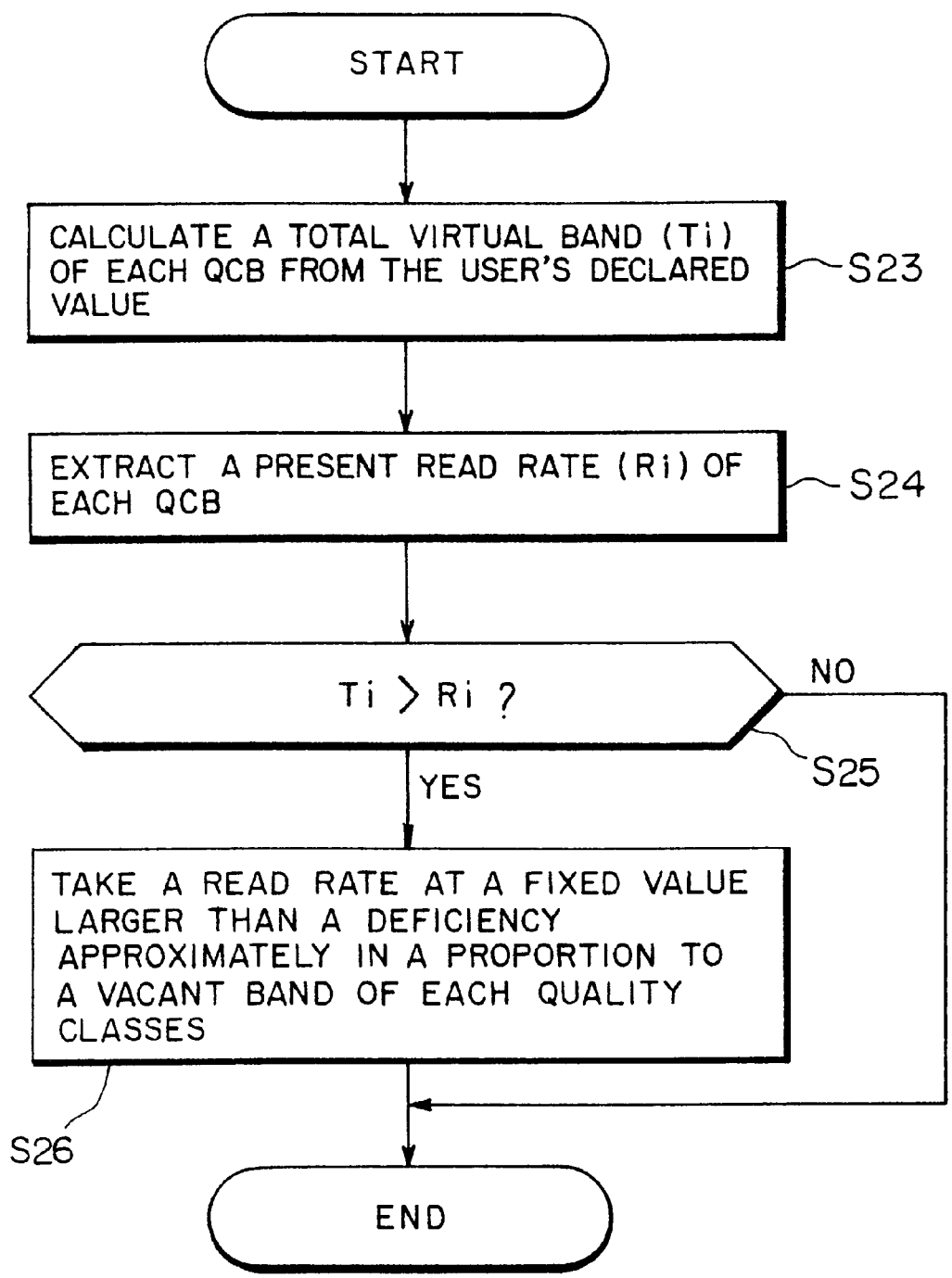
Figure 20:
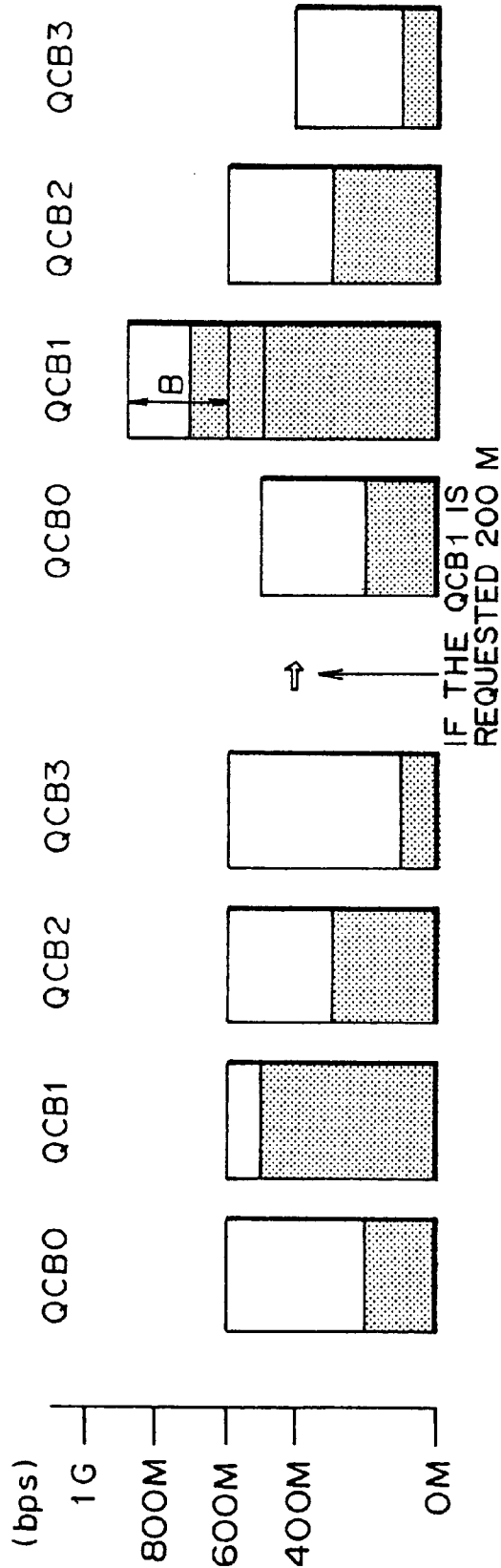
Figure 21:
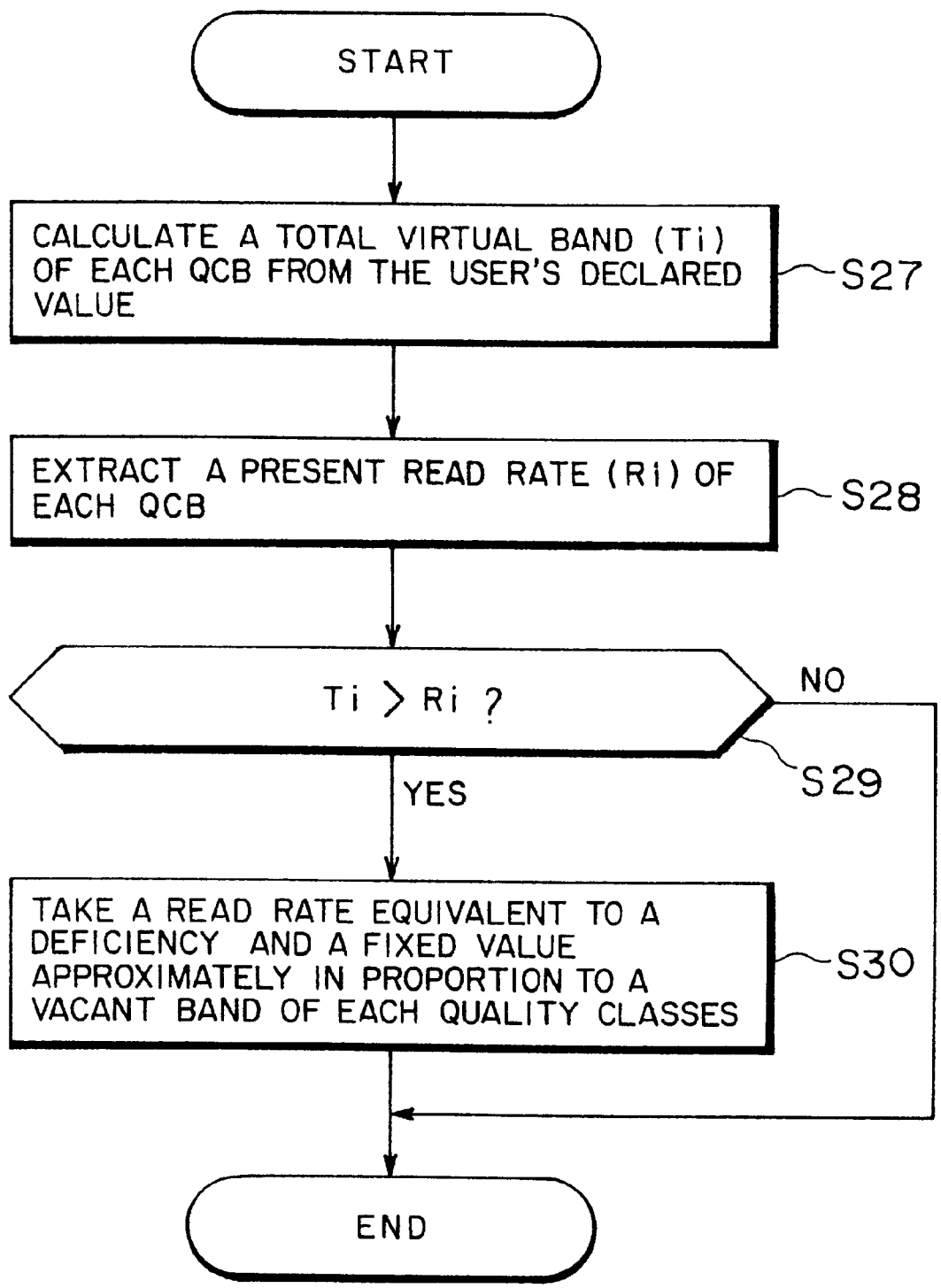
Figure 22:
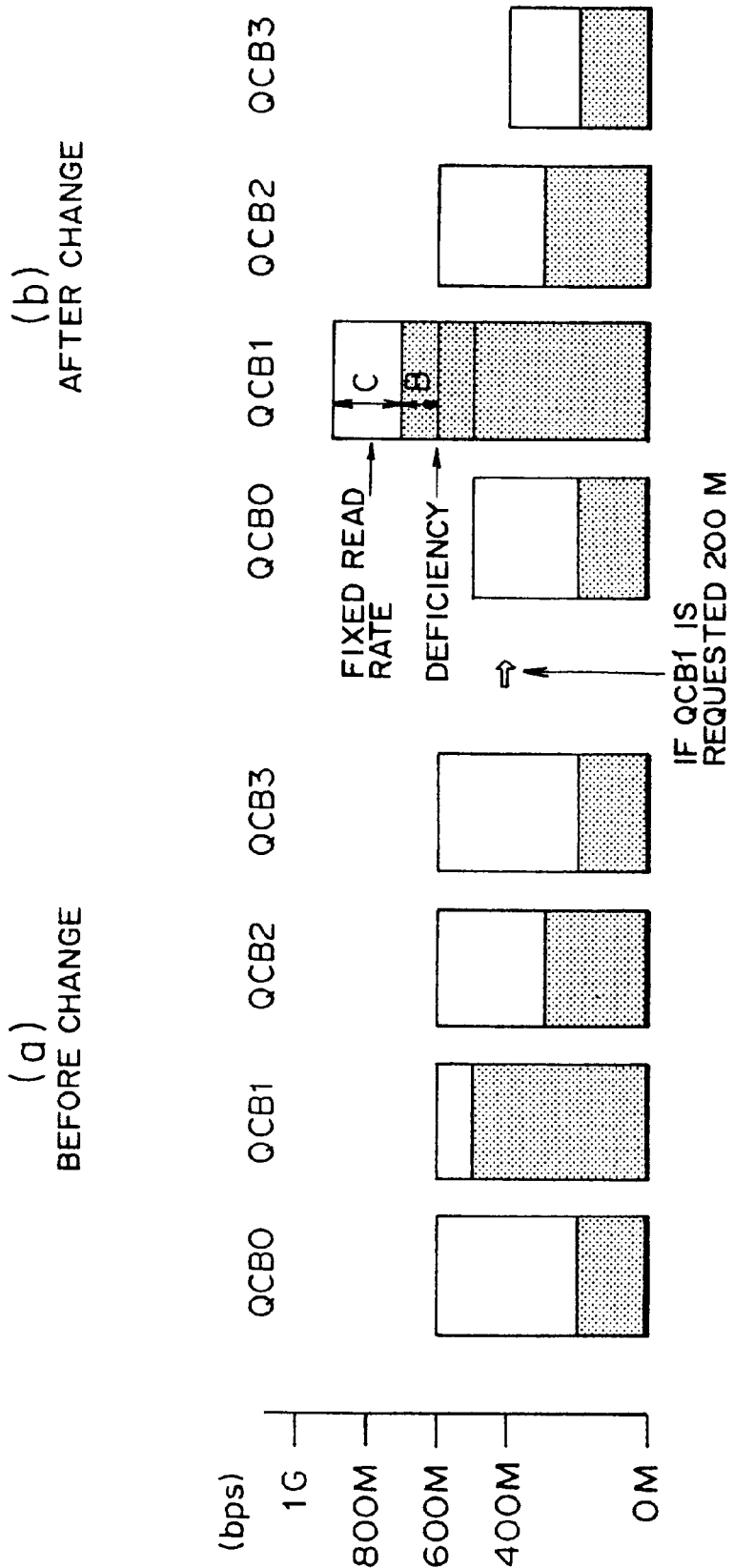
Figure 23:
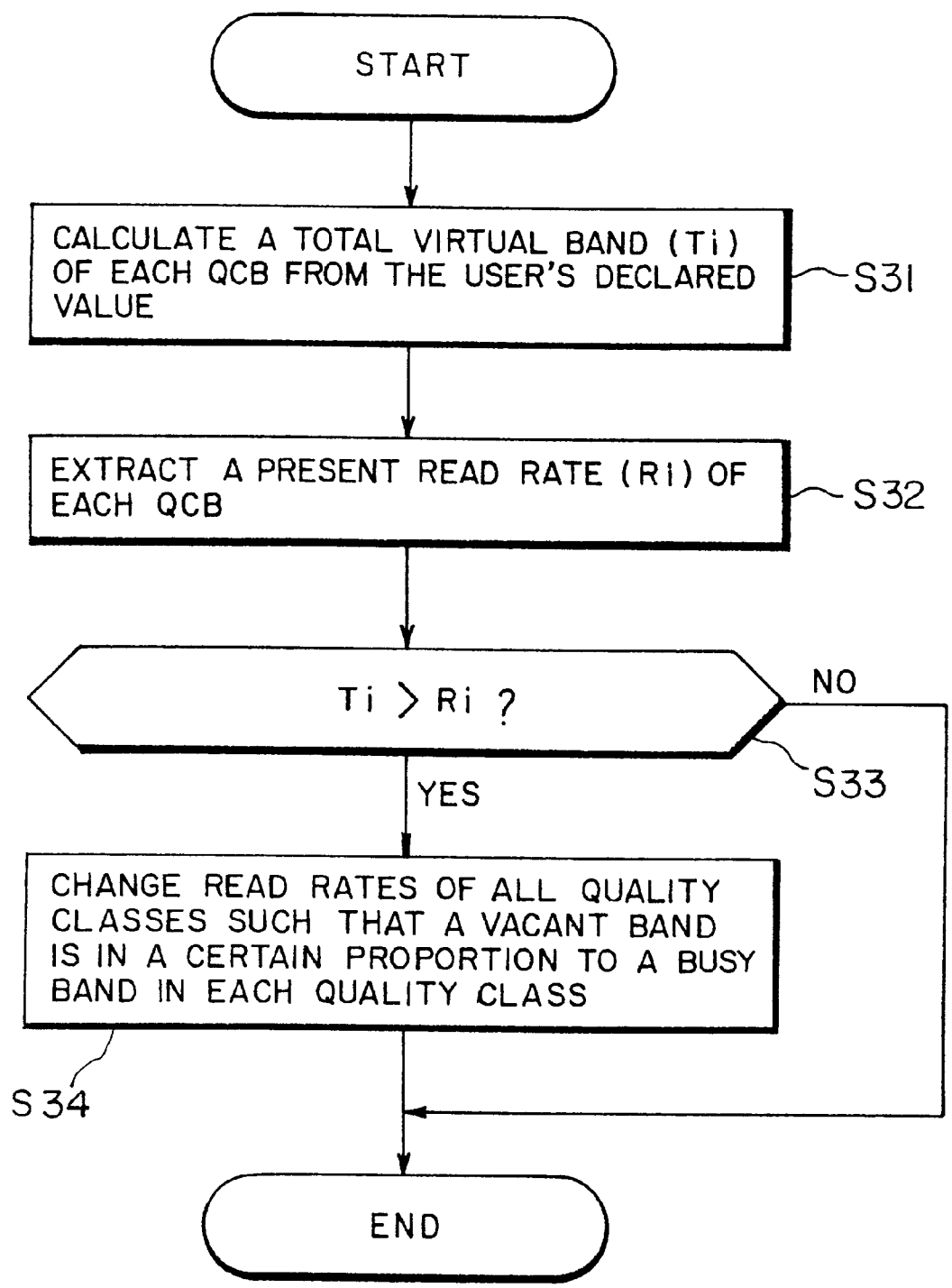
Figure 24:
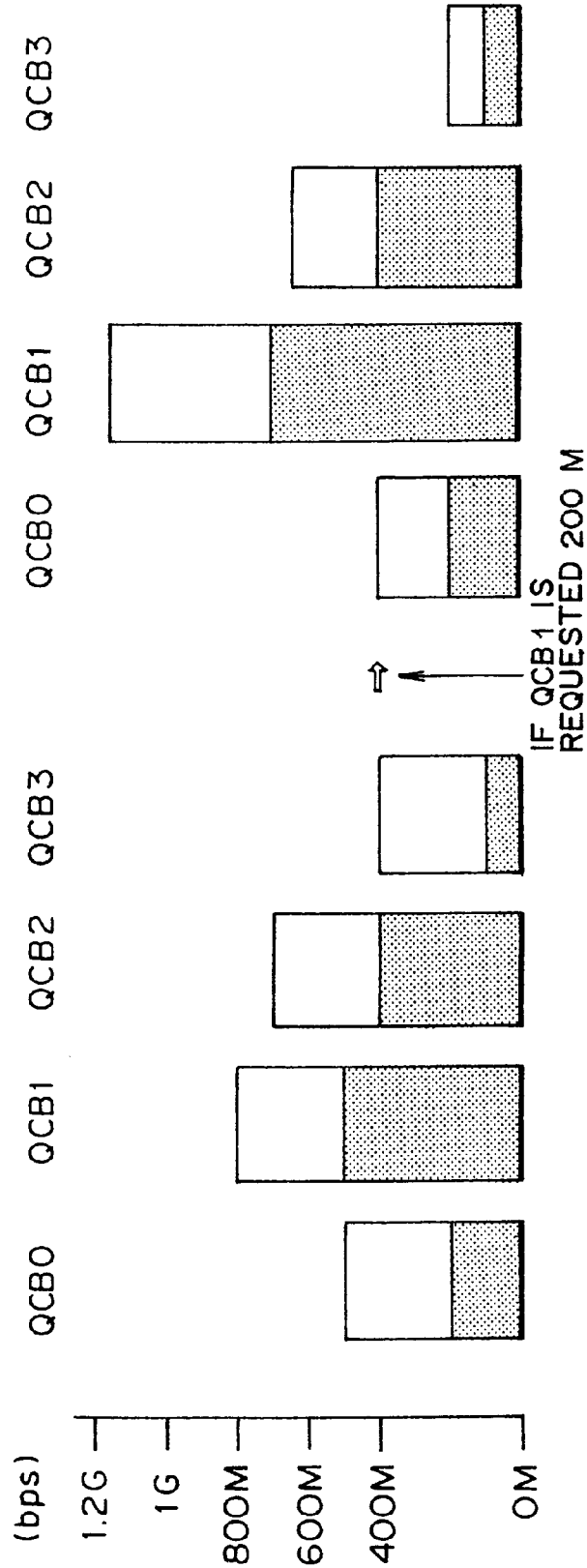
Figure 25:
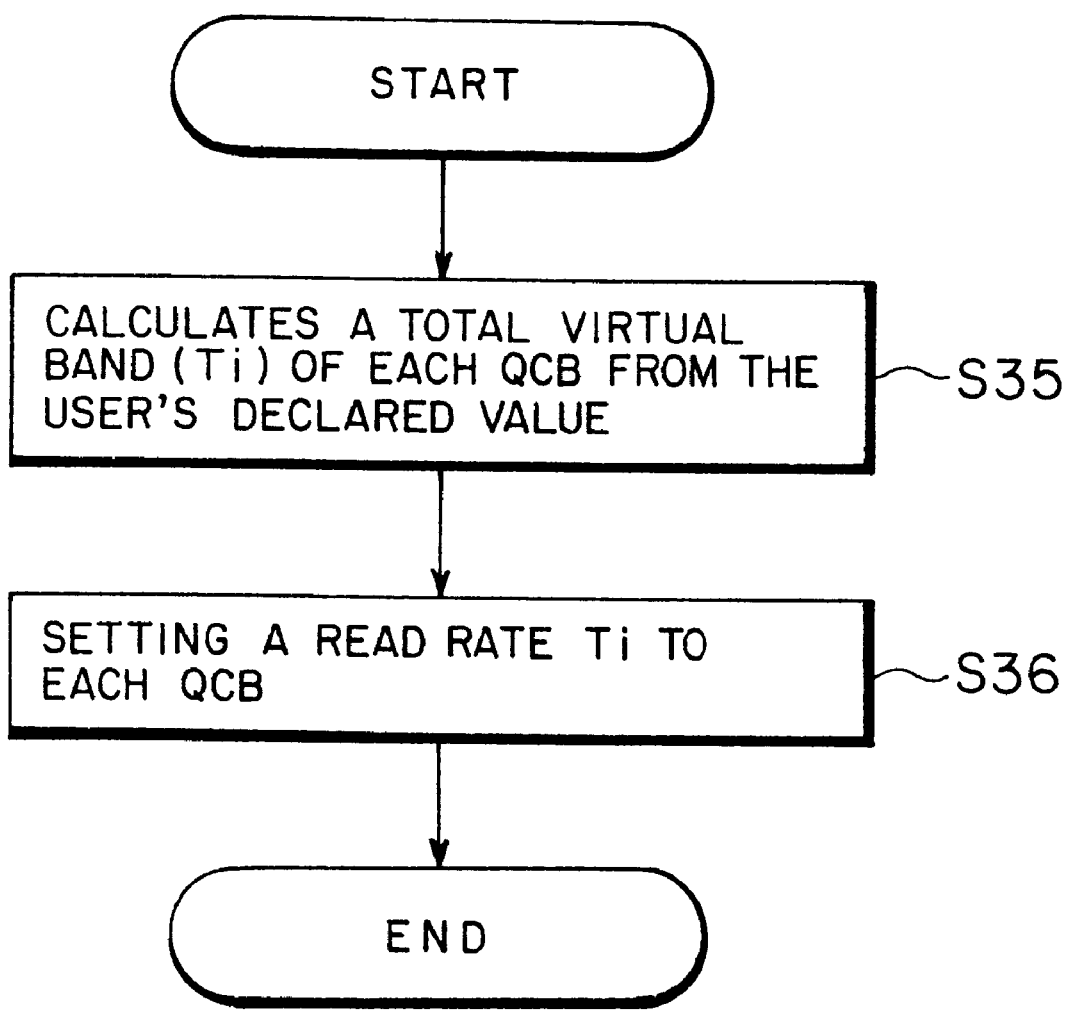
Figure 26:
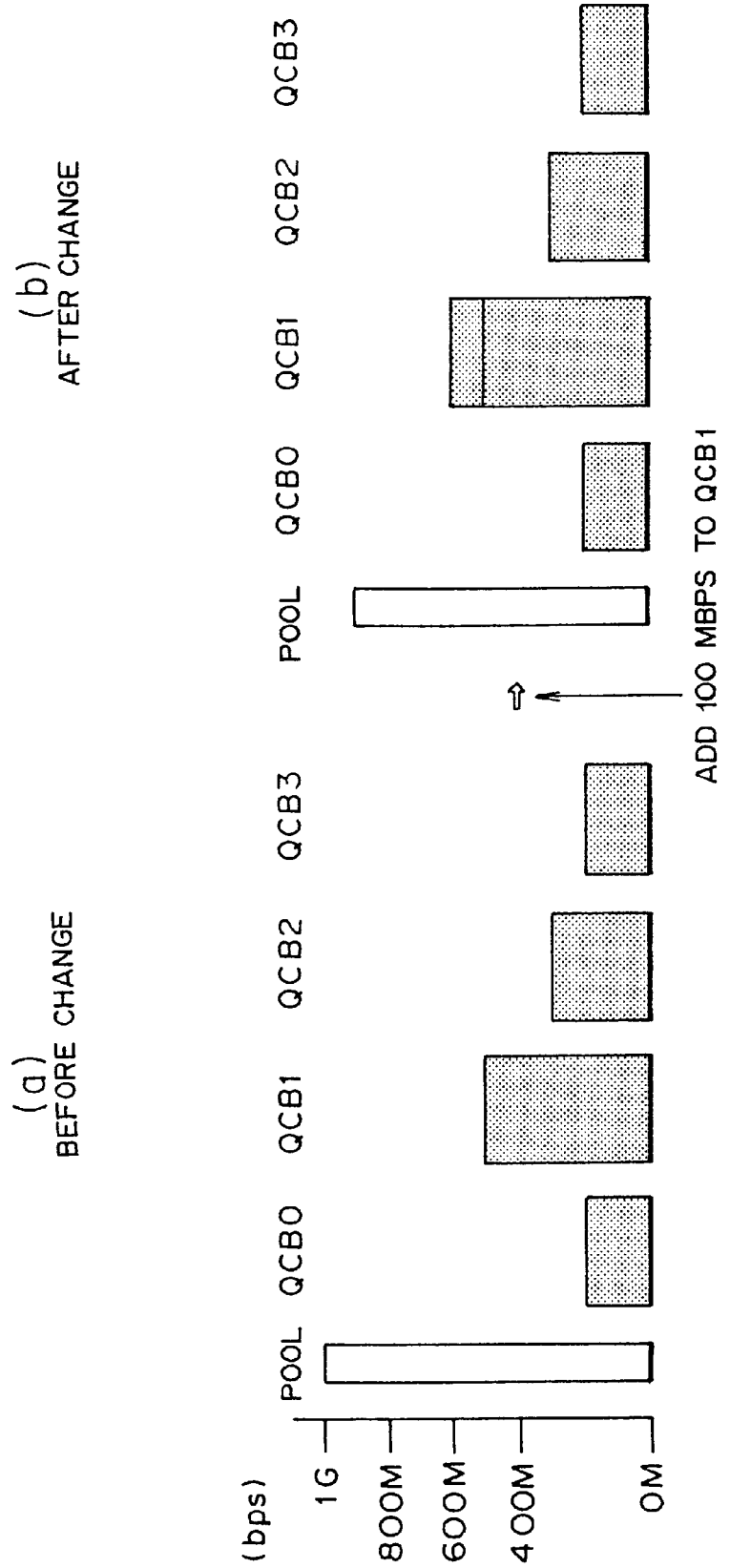
Figure 27:
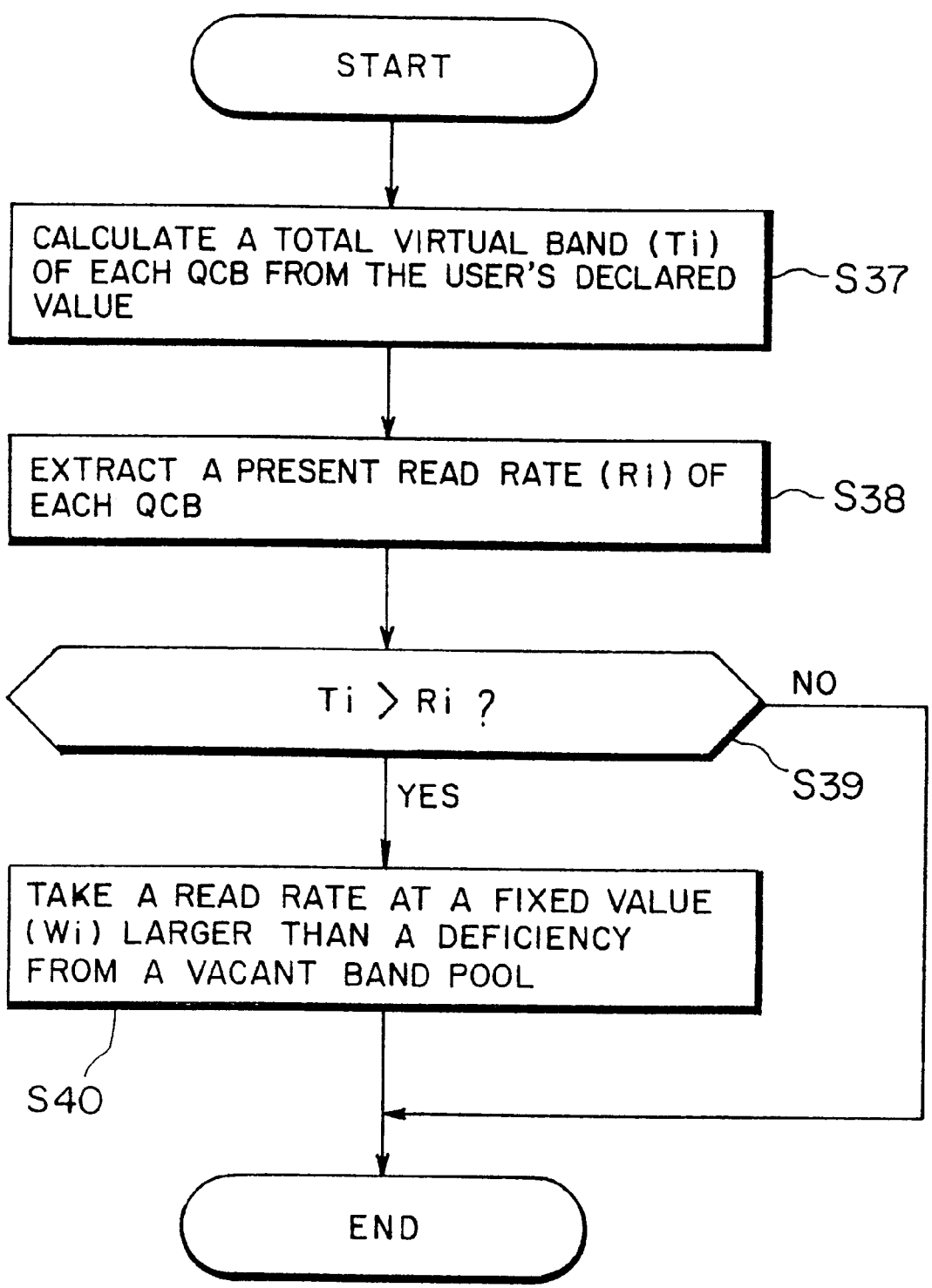
Figure 28:
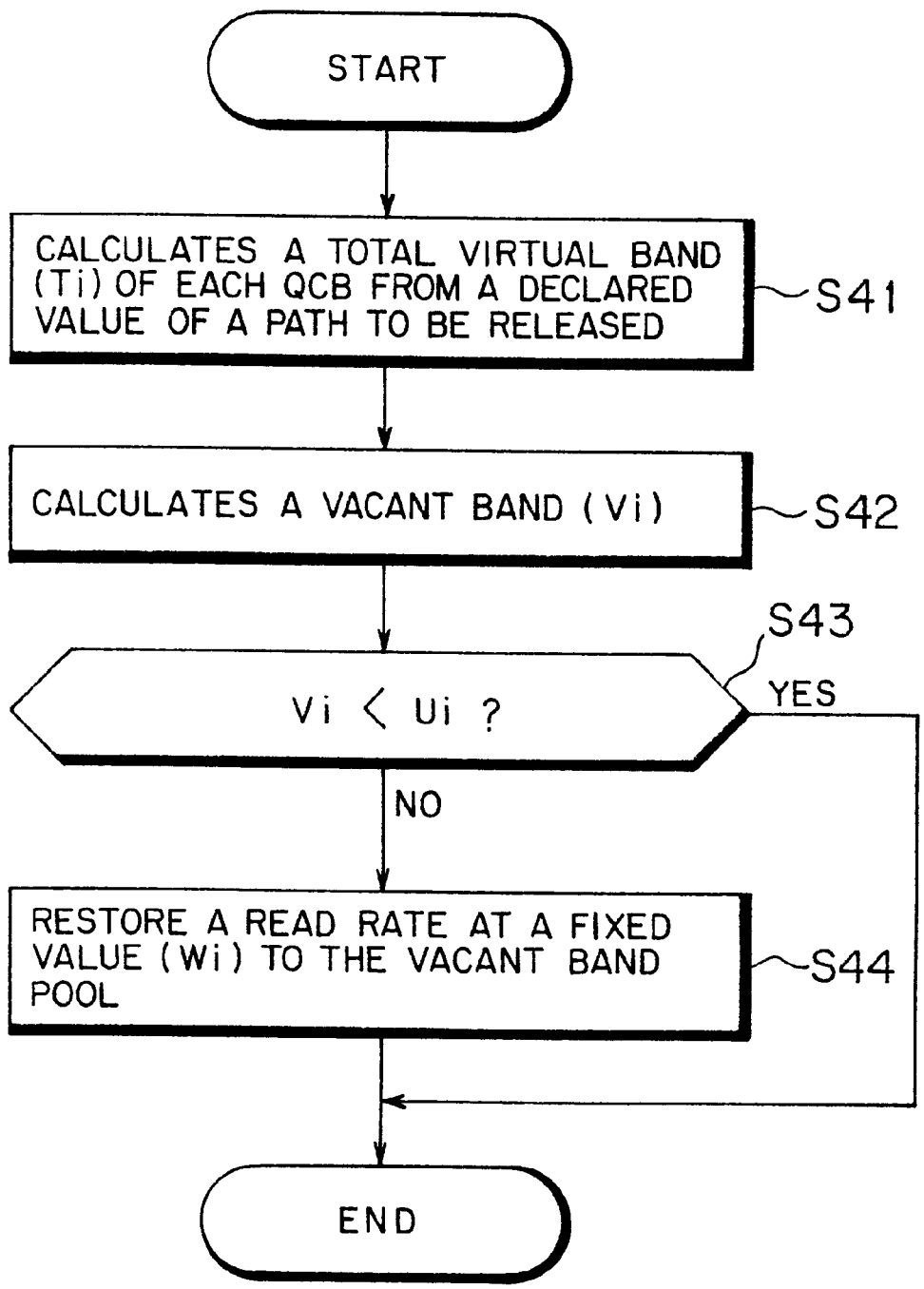
Figure 32:
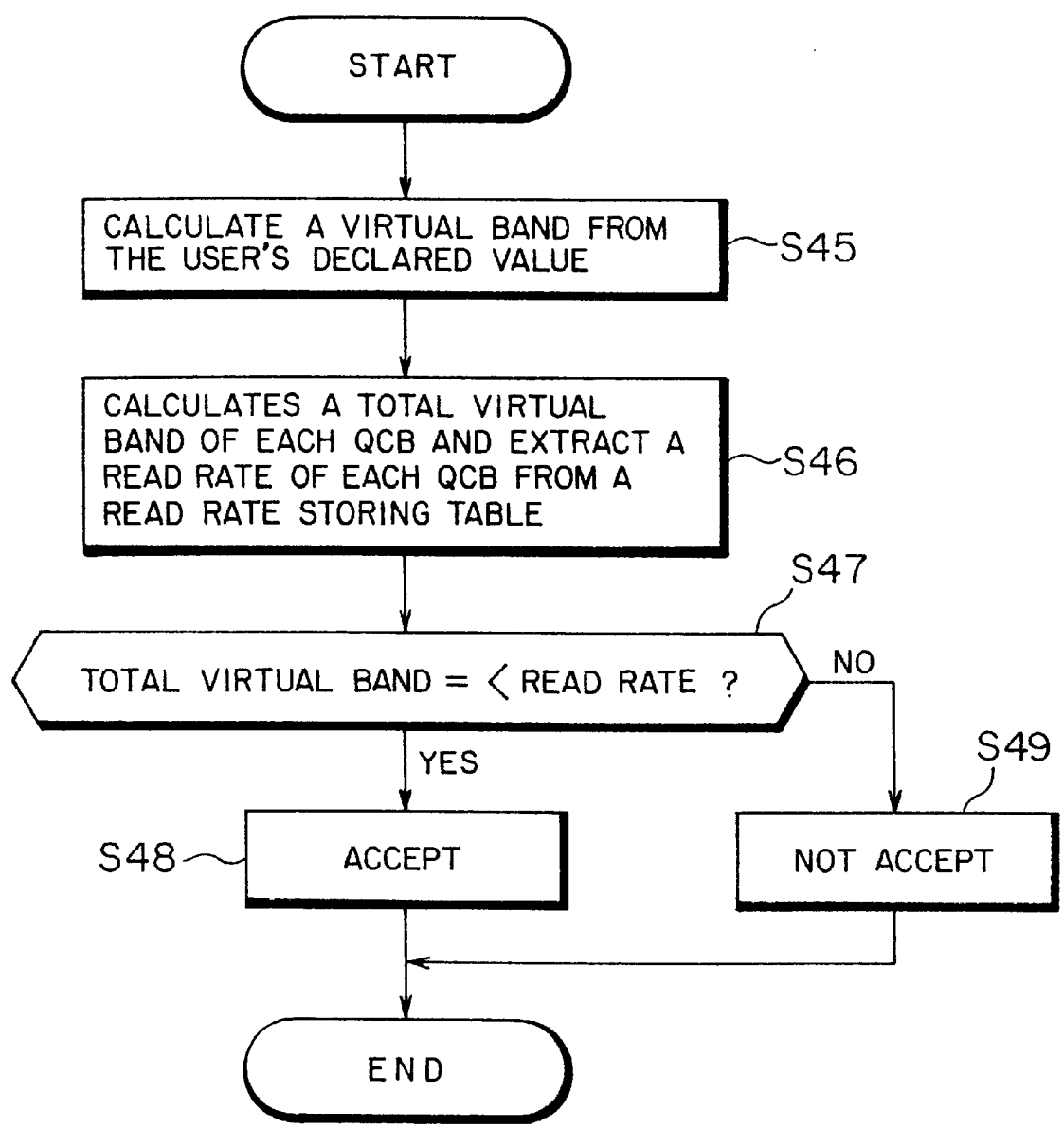
Figure 34:
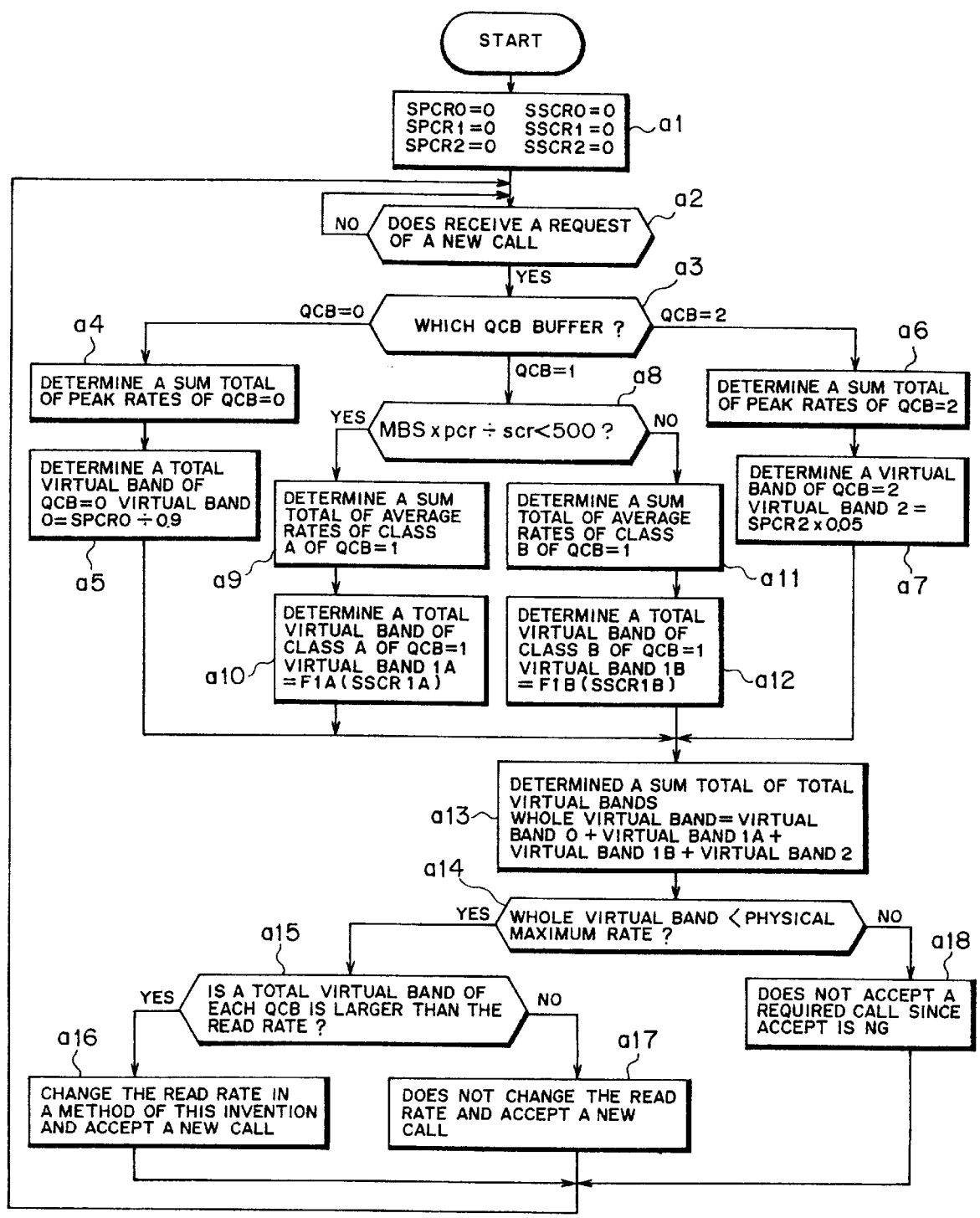
Figure 35A:
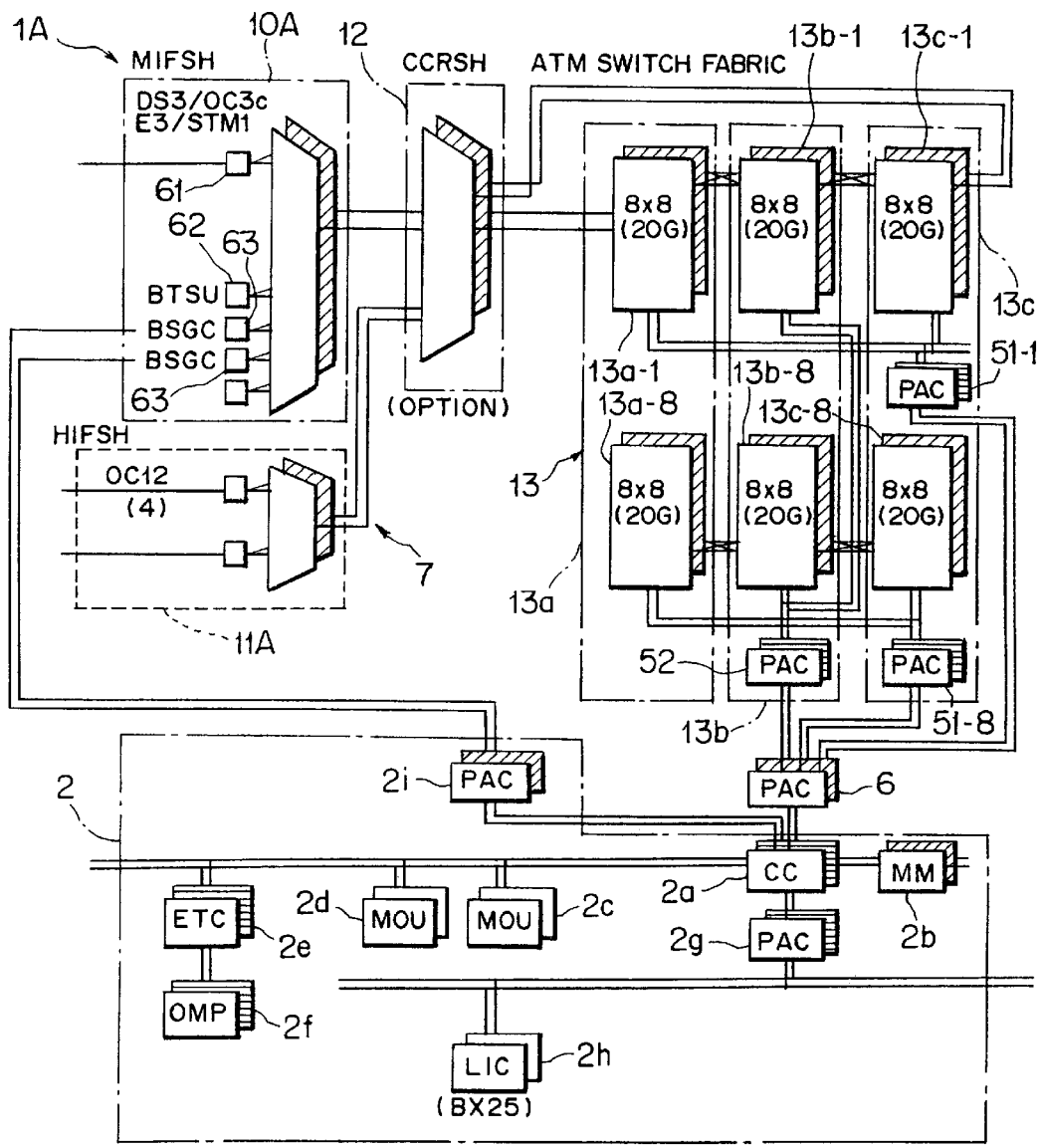
Figure 35B:
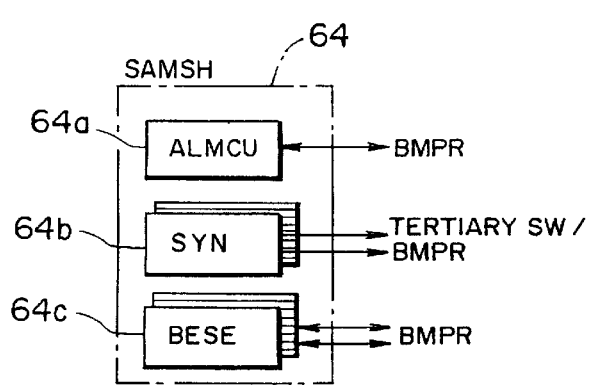

FIGS. 12(a) and 12(b) are diagrams showing an example of the read rate controlling process by the call handling processor according to the embodiment;

FIG. 13 is a flowchart for illustrating the read rate controlling process by the call handling processor according to the embodiment;

FIGS. 14(a) and 14(b) are diagrams showing an example of the read rate controlling process by the call handling processor according to the embodiment;

FIG. 15 is a flowchart for illustrating the read rate controlling process by the call handling processor according to the embodiment;

FIGS. 16(a) and 16(b) are diagrams showing an example of the read rate controlling process by the call handling processor according to the embodiment;

FIG. 17 is a flowchart for illustrating the read rate controlling process by the call handling processor according to the embodiment;

FIGS. 18(a) and 18(b) are diagrams showing an example of the read rate controlling process by the call handling processor according to the embodiment;

FIG. 19 is a flowchart for illustrating the read rate controlling process by the call handling processor according to the embodiment;

FIGS. 20(a) and 20(b) are diagrams showing an example of the read rate controlling process by the call handling processor according to the embodiment;

FIG. 21 is a flowchart for illustrating the read rate controlling process by the call handling processor according to the embodiment;

FIGS. 22(a) and 22(b) are diagrams showing an example of the read rate controlling process by the call handling processor according to the embodiment;

FIG. 23 is a flowchart for illustrating the read rate controlling process by the call handling processor according to the embodiment;

FIGS. 24(a) and 24(b) are diagrams showing an example of the read rate controlling process by the call handling processor according to the embodiment;

FIG. 25 is a flowchart for illustrating the read rate controlling process by the call handling processor according to the embodiment;

FIGS. 26(a) and 26(b) are diagrams showing an example of the read rate controlling process by the call handling processor according to the embodiment;

FIG. 27 is a flowchart for illustrating the read rate controlling process by the call handling processor according to the embodiment;

FIG. 28 is a flowchart for illustrating the read rate controlling process by the call handling processor according s9 to the embodiment;

FIGS. 29(a) and 29(b) are diagrams showing an example of the read rate controlling process by the call handling processor according to the embodiment;

FIGS. 30(a) and 30(b) are diagrams showing an example of the read rate controlling process by the call handling processor according to the embodiment;

FIGS. 31(a) and 31(b) are diagrams showing an example of the read rate controlling process by the call handling processor according to the embodiment;

FIG. 32 is a flowchart for illustrating a read rate controlling process by the call handling processor according to a modification of the embodiment;

FIG. 33 is a diagram showing another example of virtual bands and read rates set in the quality controlling buffer unit according to the embodiment;

FIG. 34 is a flowchart for illustrating the read rate controlling process by the call handling processor according to the embodiment; and FIG. 35(a) and 35(b) are block diagrams showing in detail the ATM switching system according to the embodiment.

DESCRIPTION OF THE PREFERRED EMBODIMENTS (a) Description of Aspects of the Invention Now, aspects of this invention will be described with reference to the drawings.

Figure 1:
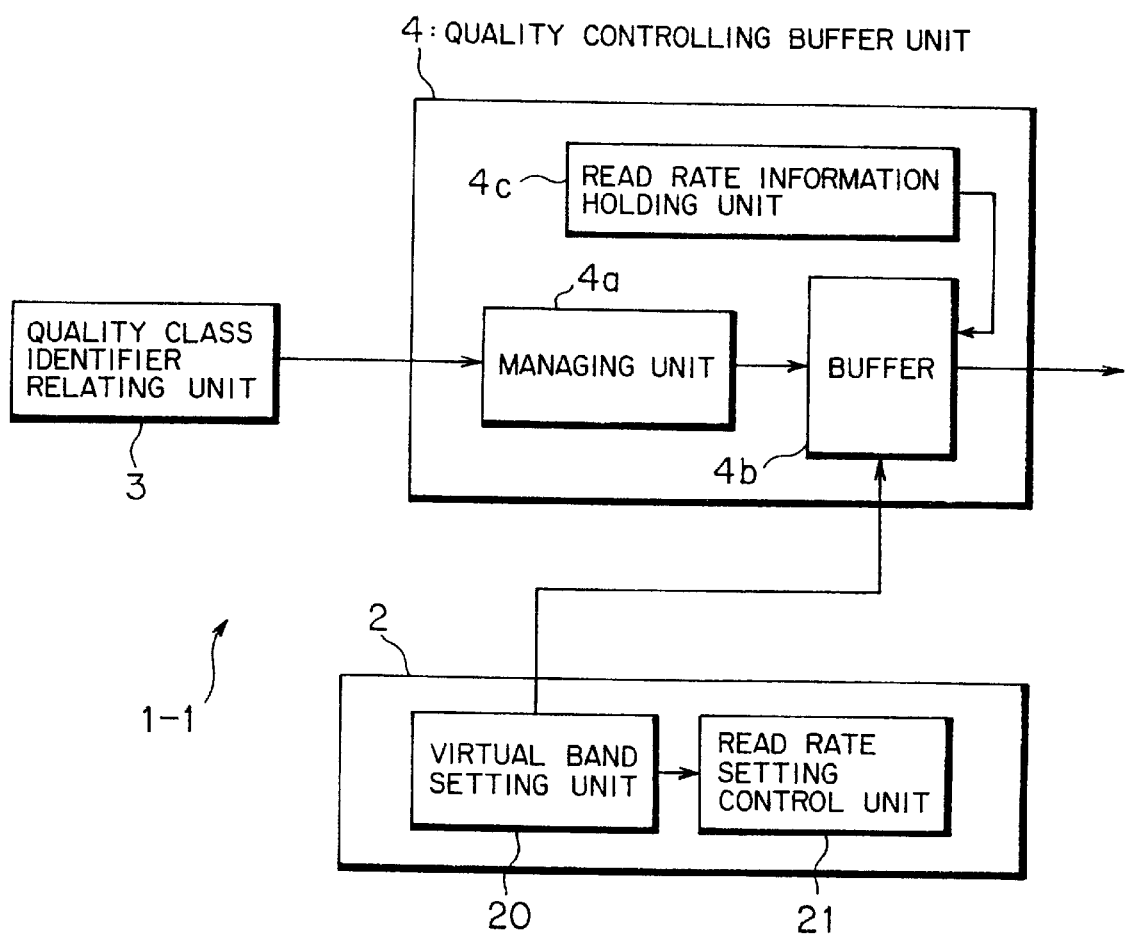
FIG. 1 is a block diagram showing a first aspect of this invention.

FIG. 1 is a block diagram showing a first aspect of this invention. In FIG. 1, reference numeral 1-1 denotes a fixed-length cell handling switching system. The fixed-length cell handling switching system 1-1 has a call handling control unit 2 for controlling call handling when a communication using a fixed-length cell is made, a quality class identifier relating unit 3 and a quality controlling buffer unit 4.

The quality class identifier relating unit 3 relates a quality class identifier according to a quality class of a fixed-length cell. The quality controlling buffer unit 4 has a managing unit 4a for managing the fixed-length cell related to the quality class identifier on the basis of the quality class identifier, a buffer 4b for storing each of the fixed-length cells managed by the managing unit 4a, and a read rate information holding unit 4c for holding information about a read rate of the fixed length cell stored in the buffer 4b.

The above call handling control unit 2 has a virtual band setting unit 20 for setting a virtual band of the buffer 4b on the basis of a quality class and a declared band of a call presently set, and a read rate setting control unit 21 for setting and controlling a read rate of the fixed-length cell held in the read rate information holding unit 4c on the basis of the virtual band set by the virtual band setting unit 20.

The above quality controlling buffer unit 4 can be provided in a position where fixed-length cell congestion may occur.

The above virtual band setting unit 20 may add a declared band declared when setting of a new call is requested to a declared band which is a base of the virtual band having been set to a quality class to operate a virtual band updated on the basis of a result of the addition. The above read rate setting unit 21 may have a band comparing unit for comparing a read rate of the fixed-length cell stored in the buffer 4b correspondingly to a present quality class with the above updated virtual band supplied from the virtual band setting unit 20 for each quality class to control the read rate of the above fixed-length cell on the basis of a result of the comparison by the band comparing unit.

Since the fixed-length cell handling switching system 1-1 according to this invention can set fixed-length cells having different qualities to respective read rate according to the qualities thereof to control the read rates, the fixed-length cell handling switching system can readily and dynamically change the read rate even if receiving a declaration exceeding a read rate already set, and independently control cell discarding and cell delay in each quality class without affecting cells of calls having different qualities on each other. In consequence, it is possible to certainly switch a fixed-length cell to be transmitted according to a required quality class, whereby a processing capability of the system is largely improved.

If it is found from a result of comparison by the above band comparing unit that there is a quality class whose updated virtual band is larger than a read rate in the fixed-length handling switching system 1-1, the above read rate setting control unit 21 increases the read rate assigned to the above quality class, whereas decreasing read rates assigned to other quality classes having vacant bands so as to adjust the read rate.

If it is found from a result of comparison by the above band comparing unit that there is a quality class whose updated virtual band is larger than the read rate, the read rate setting control unit 21 sets read rates of all quality classes so that vacant bands are such dispersed that a vacant band is in a certain proportion to a busy band in each quality class.

In the fixed-length cell handling switching system 1-1, the call handling control unit 2 can certainly secure a quality required by a relevant quality class so as to largely contribute to flexibility upon configuring the system.

In the fixed-length cell handling switching system 1-1 according to this invention, the read rate setting control unit 21 has a vacant band managing unit for managing vacant bands of the buffer 4b in respective quality classes in a pool area, and when setting of a new call is requested, the read rate setting control unit 21 can supply a read rate of a quality class corresponding to the new call on the basis of the vacant bands managed by the vacant band managing unit.

The above fixed-length cell handling switching system 1-1 according to this invention manages vacant bands of the buffer 4b in respective quality classes in the pool area, and changes a read rate according to a vacant band of a quality class set upon setup/release of a call. It is therefore only necessary to withdraw a read rate for a relevant quality class corresponding to a call out request from the pool area to change the read rate upon call out, whereby a process to move a band in the buffer 4b is simplified. This allows a read rate controlling process to be conducted quickly in the system.

In the fixed-length cell switching system 1-1 according to this invention, the read rate setting control unit 21 can supply a read rate larger than a deficiency in read rate of a fixed-length cell stored in the buffer 4b corresponding to a present quality class of an updated virtual band set by the virtual band setting unit 20.

Alternatively, the read rate setting control unit 21 can supply a read rate larger by a predetermined read rate than a deficiency in read rate of a fixed-length cell stored in the buffer 4b corresponding to a present quality class of an updated virtual band set by the virtual band setting unit 20.

In the above fixed-length cell handling switching system 1-1 according to this invention, the call handling control unit 2 can certainly secure a quality required by a relevant quality class, thereby largely contributing to flexibility upon configuring the system.

Figure 2:
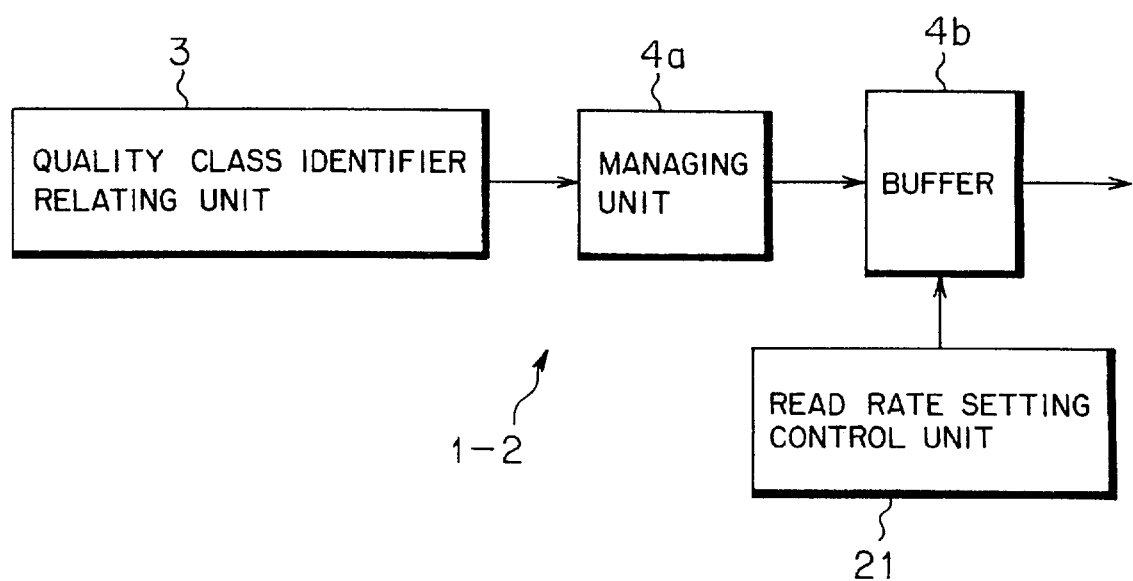
FIG. 2 is a block diagram showing a second aspect of this invention.

FIG. 2 is a block diagram showing a second aspect of this invention. A fixed-length cell handling switching system 1-2 shown in FIG. 2 has a quality class identifier relating unit 3, a managing unit 4a, a buffer 4b and a read rate setting control unit 21.

The quality class identifier relating unit 3 relates a quality class identifier to a fixed-length cell flowing in through a route of a set call on the basis of a quality class and a declared band declared when the call is set. The managing unit 4a manages a route of the fixed-length cell inputted from the quality class identifier relating unit 3 on the basis of the quality class identifier related by the quality class identifier relating unit 3. The buffer 4b stores the fixed-length cell managed by the managing unit 4a.

The read rate setting control unit 21 sets a vacant band of the buffer 4b on the basis of the quality class and the declared band, and controls a read rate of the fixed-length cell held in the buffer 4b on the basis of the virtual band.

Since the fixed-length cell handling switching system 1-2 according to this invention can set fixed-length cells having different qualities to respective read rates according to the qualities thereof to control the read rates, the fixed-length cell handling switching system 1-1 can readily and dynamically change the read rate even if receiving a declaration exceeding a read rate already set, and independently control cell discarding and cell delay in each quality class without affecting cells of calls having different qualities on each other. In consequence, it is possible to certainly switch a fixed-length cell to be transmitted according to a required quality class, whereby a processing capability of the system is largely improved.

Figure 3:
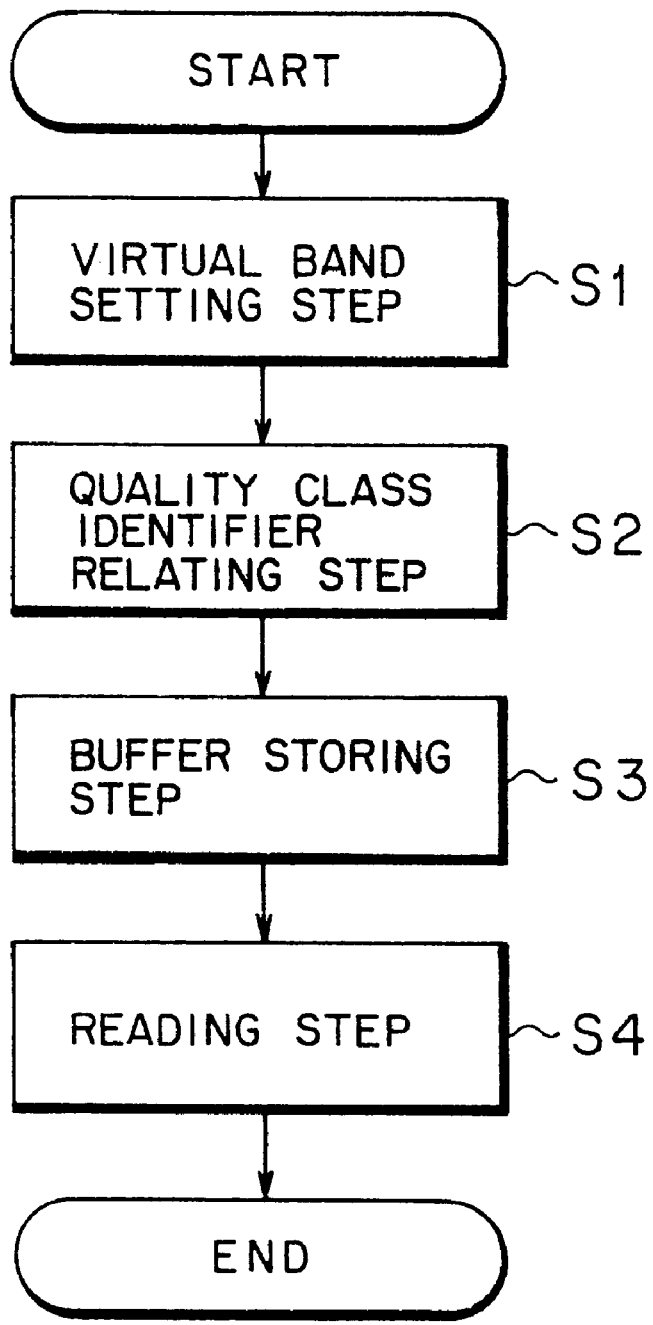
FIG. 3 is a diagram for illustrating a third aspect of this invention.

FIG. 3 is a diagram for illustrating a third aspect of this invention. In a method for controlling a read rate of a fixed-length cell, which flows in the buffer 4b and is stored on the basis of a quality class of communication to be read out at a predetermined read rate from the buffer 4b, a band control is conducted at Steps S1 through S4 as shown in FIG. 3.

At a virtual band setting step (S1), a virtual band of the above buffer 4b is set on the basis of a quality class and a declared band. At a quality class identifier relating step (S2), a quality class identifier is related to a fixed-length cell flowing in through a route of a set call on the basis of the quality class and the declared band of communication declared when the call is set.

Further, at a buffer storing step (S3), the fixed-length cell related to the quality class identifier at the quality class identifier relating step (S1) is managed on the basis of the quality class identifier and stored in the buffer 4b. At a reading step (S4), the fixed-length cell stored in the buffer 4b at the buffer storing step (S3) is read out at a read rate determined on the basis of the above quality class and the virtual band declared for each quality class under control of the call handling control unit 2.

According to the above method for controlling a read rate of a fixed-length cell according to this invention, fixed-length cells having different qualities can be set at respective read rates according to their qualities to be controlled. If there is a declaration exceeding a set read rate, it is possible to readily and dynamically change the read rate, and independently control cell discarding and cell delay in each quality class without affecting cells of calls having different qualities on each other. In consequence, it is possible to certainly switch a fixed-length cell to be transmitted according to a required quality class so as to largely improve a processing capability of the system.

According to the method for controlling a read rate of a fixed-length cell of this invention, a read rate of a a fixed-length cell stored in the buffer 4b is fixedly set on the basis of a load of a fixed-length cell in each quality class at the virtual band setting step (S1). If a virtual band of a quality class exceeds the fixedly set read rate when a new call occurs, a read rate assigned to the quality class is increased to a degree larger than a deficiency in read rate, whereas read rates assigned to other quality classes having vacant bands are decreased at the reading step (S4) so as to adjust the read rate.

According to the above method for controlling a read rate of a fixed-length cell of this invention, it is possible to secure a quality required by a relevant quality class by means of the call handling control unit 2 so as to largely contribute to flexibility upon configuring the system.

According to the method for controlling a read rate of a fixed-length cell of this invention, a read rate of a fixed-length cell stored in the buffer 4b is fixedly set according to load of the fixed-length cell in each of the quality classes, and if a virtual band of a quality class exceeds the fixedly set read rate when a new call occurs, Ad read rates of all quality classes are changed so that vacant bands are such dispersed that a vacant band is in a certain proportion to a virtual band in each of the quality class at the reading step (S4).

According to the above method for controlling a read rate of a fixed-length cell of this invention, if there is a declaration exceeding a set read rate, it is possible to readily and dynamically change the read rate, and independently control cell discarding and cell delay of each quality class without affecting cells of calls having different qualities on each other. In consequence, it is possible to certainly switch a fixed-length cell to be transmitted according to a required quality class so as to largely improve a processing capability of the system.

In the method for controlling a read rate of a fixed-length cell according to this invention, vacant bands of the buffer 4b in all quality classes are managed in a pool area, and a read rate can be changed at the reading step (S4) on the basis of a virtual band of a quality class set when the above call is set/released at the virtual band setting step (S1) Alternatively, vacant bands of the buffer 4b in all quality classes are managed in the pool area, and when setting of a new call is requested, a read rate at a fixed value larger than a virtual band of a quality class which will be increased due to the setting of the new call can be supplied on the basis of the vacant bands a the reading step (S4), or when a vacant band large than a read rate at a fixed value having been set in advance is generated due to release of a call, a vacant band at a fixed value can be restored to the pool area.

Still alternatively, vacant bands of the buffer 4b in all quality classes are managed in the pool area, and when setting of a new call is requested, a read rate at a fixed value larger than a vacant band of a quality class which will be increased due to the setting of the new call can be supplied at the reading step (S4), whereas even if a vacant band is generated due to release of a call, a read rate of the buffer 4b in a quality class in which the above call is released is maintained until setting of the next new call is requested.

According to the above method for controlling a read rate for a fixed-length cell of this invention, vacant bands of the buffer 4b in all quality classes are managed in the pool area, and a read rate is changed according to a vacant band of a quality class set when a call is set/released. It is therefore only necessary to withdraw a read rate of a quality class corresponding to a call out request from the pool area upon call out so that a process to move a band in the buffer 4b is simplified. In consequence, the read rate controlling process in this system may be quickly carried out.

According to the method for controlling a read rate of a fixed-length cell of this invention, it is possible to adjust a read rate at a fixed value larger than a deficiency in read rate in order with a quality class having the largest vacant band as the above other quality class having a vacant band. It is also possible to adjust a read rate obtained by adding a deficiency in read rate and a read rate at a fixed value in order with a quality class having the largest vacant band as the above other quality class having a vacant band.

Alternatively, it is possible to adjust a read rate by equally distributing a read rate at a fixed value larger than a deficiency with quality classes other than the above quality class as the above other quality classes having vacant bands. It is also possible to adjust a read rate by equally distributing a read rate obtained by adding a deficiency in read rate to a read rate at a fixed value with quality classes other than the above quality class as the above other quality classes having vacant bands.

Still alternatively, it is possible to adjust a read rate by distributing a read rate at a fixed value larger than a deficiency in proportion to a vacant rate of each quality class with quality classes other than the above other quality class as the above other quality classes having vacant bands. It is also possible to adjust a read rate by distributing a read rate obtained by adding a deficiency in read rate to a read rate at a fixed value in proportion to a vacant rate of each quality class with quality classes other than the above quality class as the above other quality classes having vacant bands.

According to the above method for controlling a read rate for a fixed-length cell of this invention, it is possible to certainly secure a quality required by a relevant quality class by means of the call handling control unit 2 so as to largely contribute to flexibility upon configuring the system.

(b) Description of an Embodiment of the Invention

Hereinafter, description will be made of an embodiment of this invention referring to the drawings.

Figure 4:
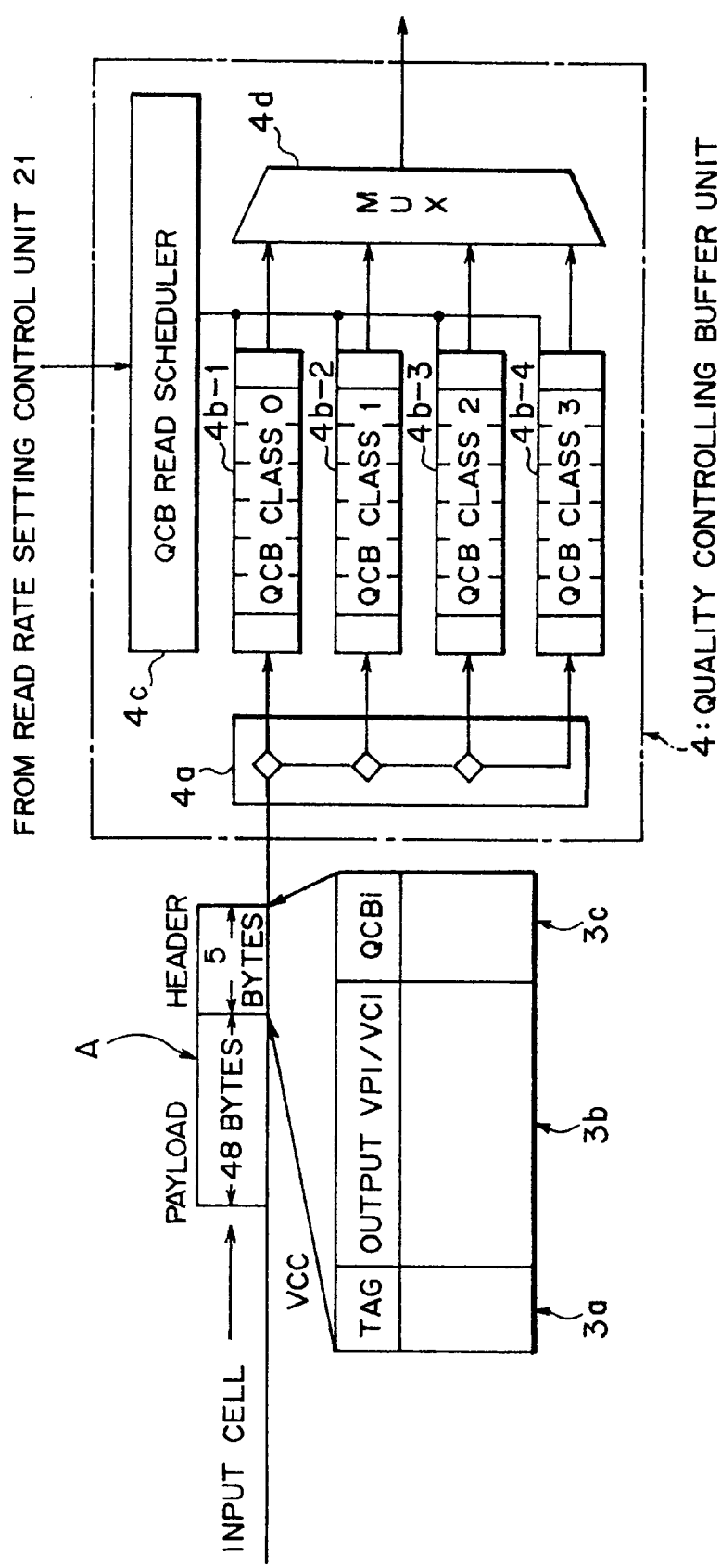
FIG. 4 is a block diagram showing a structure of an essential part of an ATM switching system according to an embodiment of this invention.

FIG. 4 is a block diagram showing an essential structure of a fixed-length cell handling switching system according to an embodiment of this invention. In FIG. 4, reference numeral 4 denotes a quality controlling buffer unit. The quality controlling buffer unit 4 can be applied to an ATM switching system (fixed-length cell handling switch) 1A in an ATM (Asynchronous Transfer Mode) communication system 50 shown in FIG. 5.

Figure 5:
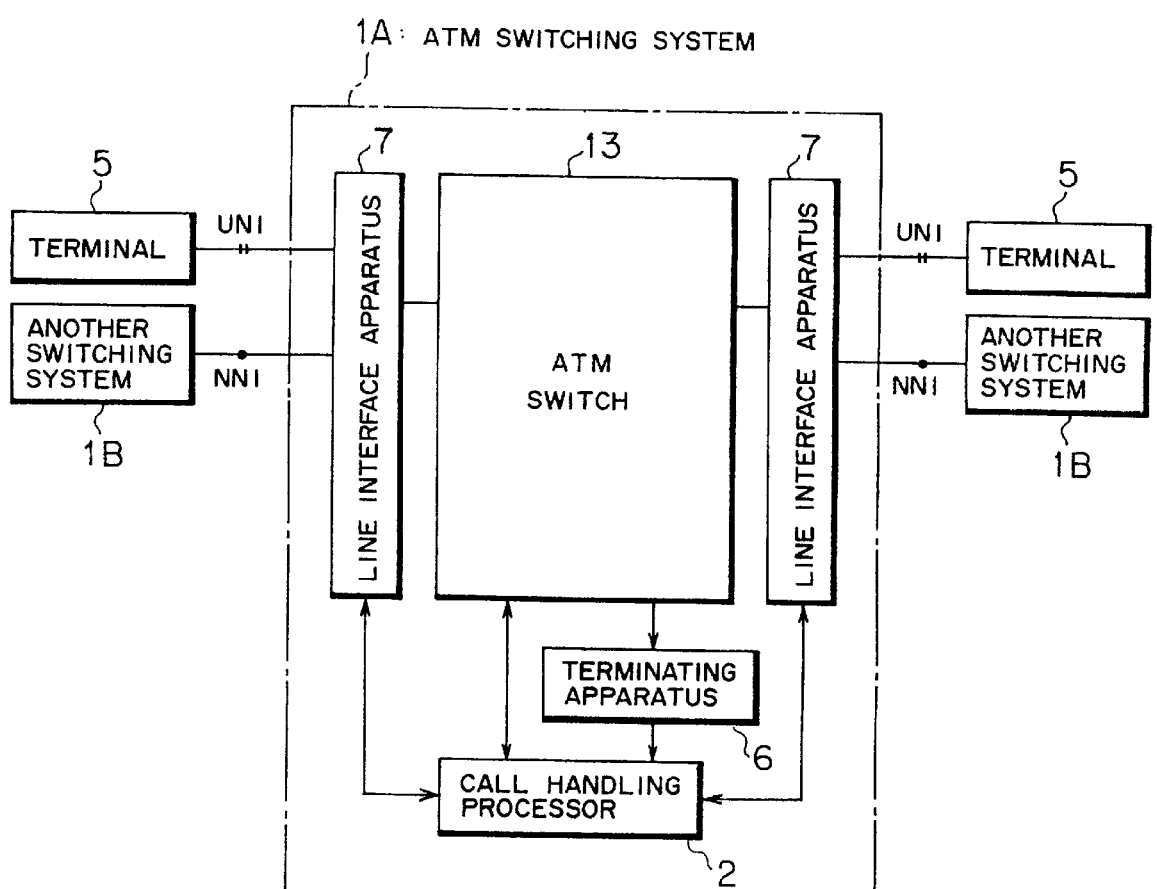
FIG. 5 is a block diagram showing a structure of an ATM cell communication system applicable to the ATM switching system according to the embodiment.

In the ATM communication system 50 shown in. FIG. 5, the ATM switching system 1A handles a fixed-length cell (ATM cell; data of 53 bytes generally consisting of a header portion of 5 bytes and a data portion of 48 bytes) exchanged with each terminal 5 or another switching system 1B, which can asynchronously transmit each ATM cell to a transfer destination according to the header portion attached to each ATM cell.

The ATM switching system 1A is connected to another switching system (another ATM switch) 1B via NNI (Network Node Interface) as a connection line. The ATM switching system 1A accommodates the terminal 5 via UNI (User Network Interface) as the connection line, which has a call handling processor 2, a terminating apparatus 6, a line interface apparatus 7 and an ATM switch 13.

The ATM switch (MSSR; Multi Stage Self Routing) 13 automatically selects a transfer route of an ATM cell flowing in through the above connection line according to tag information [routing information (VCI; Virtual Channel Identifier) such as a transfer destination address and the like] set in the header portion.

The call handling processor 2 controls the above ATM switch 13, thereby controlling a routing process on a call when a communication is made using an ATM cell.

The call handling processor 2 enables exchange of information with a terminal [each subscriber's terminal (user)] 5 accommodated by its own station (the ATM switching system 1A) through the UNI as the connection line, besides enabling exchange of information with another station (another switching system 1B) through the NNI as the connection line.

The terminating apparatus 6 terminates a message cell or the like flowing into the ATM switching system 1A, and transmits the terminated-message information or the like to the call handling processor 2. The line interface apparatus 7 interfaces the connection lines (UNI, NNI) with the ATM switch 13.

Figure 6:
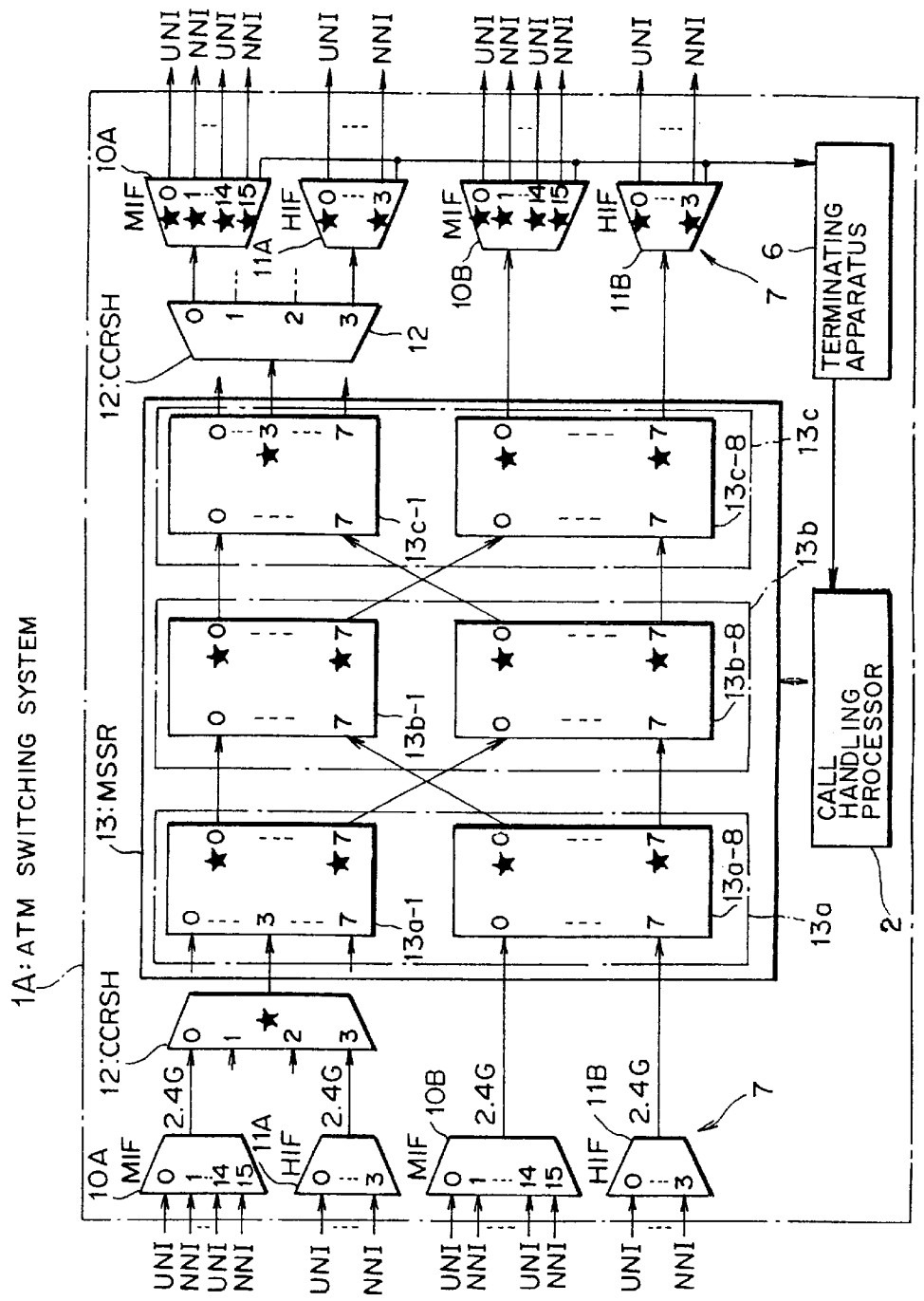
FIG. 6 is a block diagram showing an internal structure of the ATM switching system according to the embodiment.

The above interface apparatus 7 has, as shown in FIG. 6, for example, middle interfaces [MIF; Middle Interface (middle-speed interface)] 10A and 10B, high interfaces [HIF; High Interface (high-speed interface)] 11A and 11B and a concentrator (CCRSH) 12.

Each of the middle interfaces 10A and 10B, and the high interfaces 11A and 11B can accommodate lines for 2.4 Gbps. In concrete, each of the middle interfaces 10A and 10B can multiplex/demultiplex 16 lines (150 Mbps×16) of information (information of 150 Mbps per line) from the terminal 5 and another switching system 1B obtained through the UNI and NNI. Each of the high interfaces 11A and 11B can multiplex/demultiplex 4 lines (600 Mbps×4) of information of 600 Mbps per line.

The concentrator 12 concentrates a plurality of data lines, and outputs the data to a small number of lines. Here, the concentrator 12 accommodates 4 lines (2.4 Gbps×4) of outputs from the middle interfaces 10A and 10B, or the high interfaces 11A and 11B, and outputs 1 line (⅔ Gbps) to any of switching elements 13a-1 through 13a-8 in the next stage. By providing the concentrator 12, it is possible to transmit ATM cells from a larger number of lines. Namely, the concentrator 12 is installed according to a transmission rate (transmission rate of an accommodated line) of ATM cells to be handled. Incidentally, each of the middle interfaces 10A and 10B, the high interfaces 11A and 11B, and the concentrator 12 can have a multiplexing/demultiplexing function unit and an output buffer not shown in detail.

The above ATM switching system 1A multiplexes a predetermined number of ATM cells from the terminal 5 or another switching system 1B using the line interface apparatus 7 to uniformly convert all the transmission rates of the ATM cells inputted to the ATM switch 13 into a high transmission rate of 2.4 Gbps so as to conduct a switching process at a high rate even on ATM cells at a low rate.

The ATM switch 13 accommodates lines each of 2.4 Gbps from the interfaces 10A, 10B, 11A and 11B to transmit information, which has a three-stage structure (switch stages 13a through 13c) as shown in FIG. 6, for example.

Each of the switch stages 13a through 13c has 8 switching elements 13a-1 through 13a-8, 13b-1 through 13b-8 or 13c-1 through 13c-8, each of which has a structure with 8 inputs and 8 outputs. Each of the switching elements 13a-1 through 13a-8, 13b-1 through 13b-8 and 13c-1 through 13c-8 successively reads routing tag information (tag information) stored in the header portion of each ATM cell, and repeatedly chooses "0" or "1", thereby automatically selecting a route.

Incidentally, each of the switching elements 13a-1 through 13a-8, 13b-1 through 13b-8 and 13c-1 through 13c-8 can have an output buffer not shown for outputting the ATM cell to the rear stage.

The above-mentioned switch stages 13a and 13c configure CRSWSHA (Cross Switch Shelf A), whereas the switch stage 13b configures CRSWSHB (Cross Switch Shelf B).

The above ATM switching system 1A shown in FIG. 6 has a structure as shown in detail in FIGS. 35(a) and 35(b).

Here, as NNI connected to MIFSH 10A configuring the line interface apparatus 7, an interfacing apparatus 61 which interfaces, for example, SONET/SDH signals (for example, DS3/OC3c/E3/STM1, etc.) may be used. As NNI connected to HIFSH 11A, the interfacing apparatus 61 which interfaces SONET/SDH signals such as OC 12c (for example, DS3/OC3c/E3/STM1, etc.) may be used.

Further, as a connection line connected to MIFSH 10A, there are provided BTSU (Broadband Test Unit) 62 which conducts a signal interfacing process as a supervisory control system and BSGC (Broadband Signalling Circuit) 63.

The BTSU 62 conducts the interfacing process on a signal used to make a switch continuity test of ATM cells, whereas the BSGC 63 terminates a message for SVC (Switched Virtual Channel) from the user, which also has a function as the above-mentioned terminating apparatus 6.

The MSSR 13 has eight sets of switching elements 13a-n and 13c-n (n; integers from 1 to 8) configuring the above-mentioned CRSWSHA, and eight PACs (Processor Access Controllers) 51-n functioning as an interfacing apparatus for connecting the switching elements 13a-n and 13c-n to the terminating apparatus 6.

The MMSR 13 also has PAC 52 which functions as an interfacing apparatus for connecting each of the switching elements 13b-1 through 13b-8 configuring the above-mentioned CRSWSHB to the terminating apparatus 6.

Ad Therefore, the terminating apparatus 6 conducts the interfacing process when signals are exchanged between the above PACs 51-1 through 51-8 and 52, and the call handling processor 2, which functions as the PAC.

The call handling processor 2 has, in detail, CC (Central Controller) 2a, MM (Main Memory) 2b, MOUs (Magneto-Optic Disk Units) 2c and 2d, ETC (Ethernet Controller) 2e, OMP (Operation And Maintenance Processor) 2f, PAC 2g, LIC (Link Controller) 2h and PAC 2i.

The CC 2a controls a routing process on a call in the above MSSR 13 upon communication using ATM cells by, for example, having necessary data accesses to the MM 2b, which functions as a virtual band setting unit 20 and a read rate setting control unit 21, both of which will be described later.

The MM 2b is connected to the CC 2a via a bus 2j, in which program data is developed when a control for the routing process is operated by the above CC 2a. The MOUs 2c and 2d are connected to the CC 2a via the bus 2j, in which program data necessary when the process is controlled in the above MM 2b is retained (stored).

The ETC (Ethernet Controller) 2e is connected to the CC 2a via the bus 2j, which interfaces the bus 2j to Ethernet 2k. The OMP 2f is a terminal for maintaining and managing the ATM switching apparatus 1A, which is connected to the above ETC 2e over the Ethernet 2k.

The PAC 2g is connected to the CC 2a via the bus 2j, which conducts a signal interfacing process between the CC 2a and the LIC 2h. The LIC 2h transmits charge information fed from the call handling processor 2 to the center not shown using a line in a narrow frequency band. The PAC 2i conducts the interfacing process on signals exchanged between the BSGC 63 and the call handling processor 2.

The ATM switching apparatus 1A has SAMSH (Synchronization and Alarm Management Shelf) 64 for providing synchronous clock signals to the above MMSR 13 and the call handling processor 2, and supervising an alarm as to an operation state of the ATM switching apparatus 1A.

The SAMSH 64 has, in detail, ALMCU (Alarm Control Unit) 64a for controlling an output of the alarm to the call handling processor 2, SYN (Synchronization) 64b for supplying the synchronous clock signal to the switching elements 13a-1 through 13c-8 as a teritary switch (Teritary SW) and the call handling processor 2, and BESE (Broadband Emergency action Start Equipment) 64c for supervising whether the call handling processor 2 operates normally or not.

The MIFSH 10A, the HIFSH 11A, the CCRSH 12, the switching elements 13a-1 through 13a-8, 13b-1 through 13b-8 and 13c-1 through 13c-8, the PACs 2i and 6, and the MM 2b mentioned above operate in a master-slave structure. The CC 2a, the ETC 2e, the OMP 2f, the PACs 2g, 51-1 through 51-8 and 52, the SYN 64b and the BESE 64c operate in a redundant structure having an active system and a standby system. The MOU 2c, the MOU 2d and LIC 2h operate in a duplex structure.

The quality controlling buffer unit 4 shown in FIG. 4 is installed in each of the apparatus in the ATM switching system 1A shown in FIG. 6, particularly, on an outputting side of each apparatus, that is, in a part where ATM cell discarding may occur. For example, the above quality controlling buffer unit 4 can be used as an output buffer provided on the outputting side of each of the concentrator 12, the switching elements 13a-1 through 13a-8, 13b-1 through 13b-8 and 13c-1 through 13c-8, the middle interfaces 10A and 10B, and the high interfaces 11A and 11B, as indicated by "★" in FIG. 6.

The quality controlling buffer unit 4 has, as shown in FIG. 4, for example, a managing unit 4a, buffers 4b-1 through 4b-4, a QCB read scheduler 4c and a multiplexer (MUX) 4d to manage and control ATM cells having a high quality and ATM cells having a low quality on the basis of information stored in the header portion of an inputted ATM cell.

The ATM cell inputted to the quality controlling buffer unit 4 is a fixed-length cell of 53 bytes consisting of a header portion of 5 bytes and a data portion (payload) of 48 bytes (refer to an arrow A in FIG. 4). In the header portion, there are stored tag information 3a used to transmit the ATM cell to a transfer destination, an output VPI (Virtual Path Identifier)/VCI (Virtual Channel Identifier) 3b, and a quality class identifier (QCBi; Quality Control Buffer Identifier) 3c.

The tag 3a is routing bits showing a direction in the ATM switch 13 in the above ATM switching system 1A. The output VPI/VCI 3b is routing bits used to discriminate which apparatus (the terminal 5 or another switching apparatus 1B) the ATM cell should be sent to.

The VPI is used to discriminate a path multiplexed according to a destination of each line, which is determined for each interface. The VCI corresponds to an information communication path set between the terminals 5, which is determined for each VP (Virtual Path). The quality class identifier 3c is bits used to discriminate a quality of the ATM cell.

The quality class identifier 3c is given when a virtual channel converting unit (VCC; Virtual Channel Converter, not shown) provided in the line interface apparatus 7 on the line inputting side converts the VPI/VCI. Namely, the VCC has a function as a quality class identifier relating unit for relating the quality class identifier according to a quality class of an ATM cell.

The above quality class indicates a required communication quality of a set class. In the VCC, QCBi is related correspondingly to VPI/VCI set to each call. For instance, it is said that a communication which is permitted even if its cell discarding rate is high is in a lower quality class, whereas a communication requiring a relatively low cell discarding rate is in a high quality class.

The related quality class identifier 3c in the header portion of an ATM cell having been switched in the ATM switching system 1A is removed in the final output stage (in the line interface apparatus 7 on the line outputting side) when the ATM cell is transmitted to another switching system 1B (or the terminal 5).

The managing unit 4a shown in FIG. 4 manages an ATM cell related to the quality class identifier 3c by the VCC on the basis of the quality class identifier 3c. Here, the managing unit 4a manages the ATM cell by classifying the ATM cell into any one of four quality classes (QCB0 through QCB3) according to a quality class identifier number, and storing the ATM cell in a corresponding one among the four buffers 4b-1 through 4b-4 according to a result of the classification. In this embodiment, each of the buffers 4b-1 through 4b-4 has a fixed length.

Namely, ATM cells are such managed that an ATM cell classified into a quality class QCB0 is stored in the buffer 4b-1, an ATM cell classified into a quality class QCB1 is stored in the buffer 4b-2, an ATM cell classified into a quality class QCB2 is stored in the buffer 4b-3, and an ATM cell classified into a quality class QCB3 is stored in the buffer 4b-4. In this embodiment, each of the buffers 4b-1 through 4b-4 has a fixed length.

The buffers 4b-1 through 4b-4 store ATM cells having different qualities managed by the managing unit 4a. Each of the buffers 4b-1 through 4b-4 sends the ATM cell to the multiplexer 4d in the next stage at a read rate set for each quality class to each of the buffers 4b-1 through 4b-4 by a read rate setting control unit 21 described later.

In concrete, a virtual band and a read rate corresponding to the virtual band is set to each of the buffers 4b-1 through 4b-4 as shown in FIG. 8, whereby it is possible to manage and holdATM cells of different qualities. Incidentally, a difference between the read rate and the virtual band is assigned as a vacant band which is used to secure a quality in each of the buffers 4b-1 through 4b-4. In setting the above virtual band, another parameters such as cell delay variation, etc., are also considered.

The greater the vacant band relative to the virtual band (the greater the read rate relative to the virtual band), the harder the cell discarding due to cell congestion occurs so that it is possible to secure a high quality. On the other hand, the smaller the vacant band, the lower the quality will be.

In FIG. 8, a class 0 whose read rate is two times the virtual band (100 Mbps→200 Mbps) has the highest quality, whereas a class 1 whose read rate is equal to the virtual band (200 Mbps→200 Mbps) has the lowest quality, for example. Here, there are set 4 quality classes. However, it is possible to suitably set the number of the classes according to qualities of ATM cells to be transmitted.

The QCB read scheduler (a read rate information holding unit) 4c is controlled by the read rate setting control unit 21 in the call handling processor described later to hold information about read rates for ATM cells stored in the buffers 4b-1 through 4b-4. The QCB read scheduler 4c conducts a hardware control on the above buffers 4b-1 through 4b-4.

The multiplexer 4d multiplexes ATM cells outputted from the buffers 4b-1 through 4b-4, and outputs the ATM cells at a rate of 2.4 Gbps.

Namely, each of the apparatus in the ATM switching system 1A in which the quality controlling buffer unit 4 is installed relates the tag 3a as information about a route along which an ATM cell is transferred to a destination, the output VPI/VCI 3b as information about the transfer destination and the quality class identifier 3c as information used to identify (discriminate) a cell quality to the header portion of the ATM cell, thereby discriminating an ATM cell of a high quality from an ATM cell of a low quality and transmitting the ATM cells. It is therefore possible to prevent discarding or the like of an ATM cell of a high quality due to congestion of an ATM cell of a low quality.

Figure 7:
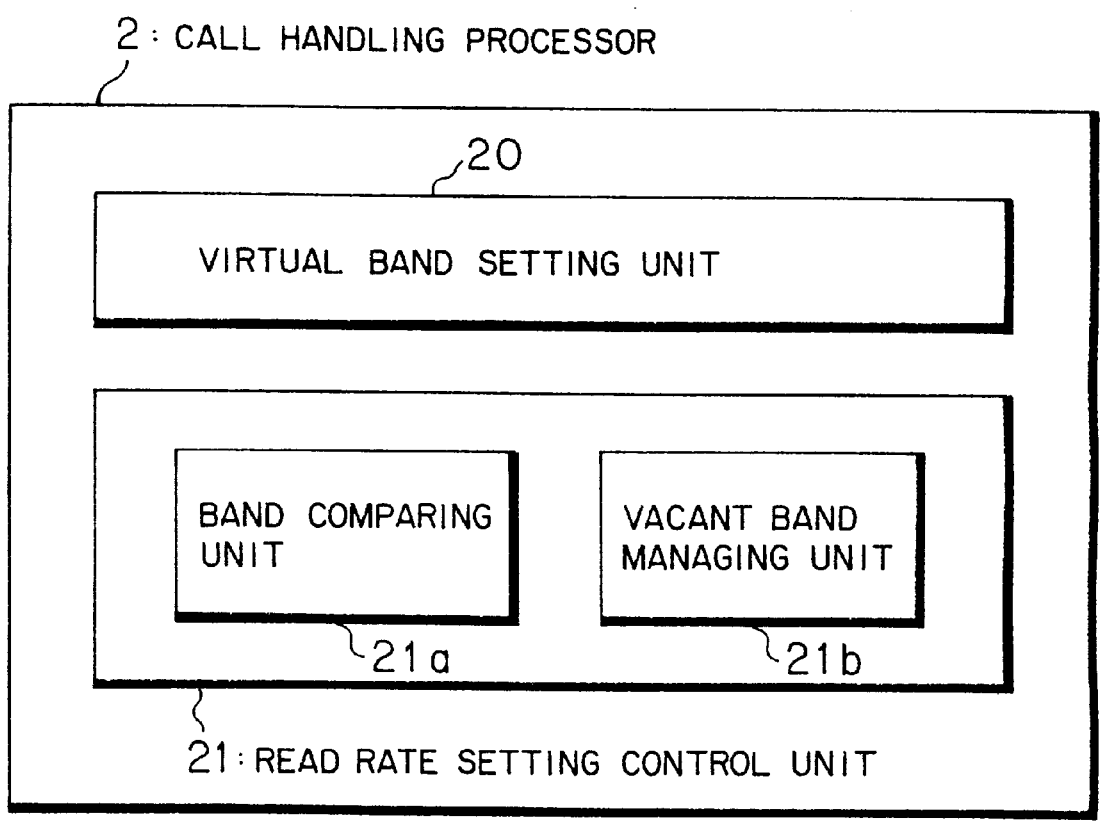
FIG. 7 is a block diagram showing an internal structure of a call handling processor according to the embodiment.

The above call handling processor 2 (refer to FIG. 5) controls a routing process on a call when a communication is made using an ATM cell. According to this invention, the call handling processor 2 also conducts a control on a read rate of a call. As shown in FIG. 7, the call handling processor 2 has, for example, the virtual band setting unit 20 and the read rate setting control unit 21.

The virtual band setting unit 20 sets a virtual band of each of the above buffers 4b-1 through 4b-4 on the basis of a quality class and a declared band of an ATM cell in a call presently set.

In concrete, when setting of a new call is requested (declared) by a setup message, the virtual band setting unit 20 adds a declared band which is a base of a virtual band having been set correspondingly to a quality class to a declared band declared by the setup message, and operates an updated virtual band (total virtual band) using a result of the addition while considering values of parameters for setting a call other than the declared band included in the setup message, thereby setting the virtual band for each of the buffers 4b-1 through 4b-4.

The above virtual band (busy band) is a maximum value of an inflow quantity of cells flowing into each of the buffers 4b-1 through 4b-4, which can be called a buffer write rate in contrast to a buffer read rate described later.

As another parameters for setting a call considered when the above update virtual band is operated, there are PCR (Peak Cell Rate), SCR (Sustainable Cell Rate), CDV (Cell Delay Validation), buffer length (capacity that the buffer 4b-1, 4b-2, 4b-3 or 4b-4 in a designated quality class requires) and MBS (Maximum Burst Size).

The read rate setting control unit 21 sets and controls a read rate for an ATM cell held in the above QCB read scheduler 4c on the basis of the virtual band set by the virtual band setting unit 20. Namely, the read rate setting control unit 21 sets and controls read rates for ATM cells stored in the buffers 4b-1 through 4b-4 corresponding to respective quality classes, which has a band comparing unit 21a and a vacant managing unit 21b.

The band comparing unit 21a compares a read rate for an ATM cell stored in the buffer 4b-1, 4b-2, 4b-3 or 4b-4 corresponding to a present quality class with a virtual band updated by the virtual band setting unit 20 for each, quality class. The vacant band managing unit 21b manages vacant bands of the buffers 4b-1 through 4b-4 in respective quality classes in a pool area.

Whereby, the read rate setting control unit 21 controls a read rate of an ATM cell stored in each of the buffers 4b-1 through 4b-4 on the basis of a result of the comparison by the band comparing unit 21a and vacant band management information with respect to the buffers 4b-1 through 4b-4 obtained in the vacant band managing unit 21b.

For instance, the read rate setting control unit 21 can conduct a read rate adjusting process such that if it is found from a result of the comparison on the bands by the above band comparing unit 21a that there is a quality class whose updated virtual band is larger than a read rate, the read rate setting control unit 21 increases the read rate assigned to that quality class and decreases read rates assigned to other quality classes having vacant bands.

Namely, the call handling processor 2 beforehand sets read rates for fixed-length cells stored in a plurality of the buffers 4b-1 through 4b-4 on the basis of a load of a fixed-length cell in each quality class, and if a virtual band of a quality class exceeds the read rate fixedly set when a new call occurs, appropriately increases the read rate assigned correspondingly to the above quality class to a rate larger than a deficiency in read rate, while decreasing read rates assigned to other quality classes having vacant bands.

The above deficiency may be a value obtained considering a vacant band satisfying communication quality required by each quality class when a communication is made in an updated virtual band.

The read rate setting control unit 21 can supply a read rate corresponding to a new call using the vacant band managing unit 21b on the basis of vacant bands managed by the vacant band managing unit 21b when setting of the new call is requested.

A mode of supplying a read rate by the quality controlling buffer unit 4 in the ATM switching system 1A will be next concretely described, paying an attention to the quality controlling buffer unit 4 [QCB0 (high quality class), QCB1 (middle quality class) and QCB2 (low quality class)] corresponding to three quality classes, with reference to FIGS. 33 and 34. FIG. 33 is a diagram showing virtual bands and read rates set in the quality controlling buffer unit 4. FIG. 34 is a flowchart for illustrating a read rate controlling process by the call handling processor (the virtual band setting unit 20 and the read rate setting control unit 21).

The virtual band and the read rate mentioned above are set to each of the quality control buffers corresponding to respective quality classes in order to manage and hold ATM cells having different qualities, as stated above with reference to FIG. 8. The virtual band in each quality class is calculated through a functional operation considering parameters such as PCR sum total, SCR sum total, etc., as shown in FIG. 33. The read rate may be derived from a set virtual band in various manner as described later.

The PCR sum total shows a sum total of peak rates (maximum values) of declared band declared by the user. In FIG. 33, the PCR sum totals are 130M, 150M, 2000M in respective quality classes.

The SCR sum total shows a sum total of average rates (average values) of a declared band declared by the user. In FIG. 33, the SCR sum total are 50M, 60M and 50M in the respective quality classes. In FIG. 33, the quality is such set that QCB 0 is in the highest quality, and the quality is gradually degraded as a number attached to QCB increases.

A manner of calculating a virtual band and a setting of a read rate (a read rate controlling process) carried out by the virtual band setting unit 20 and the read rate setting control unit 21 mentioned above are conducted according to a flowchart (a1 through a18) shown in FIG. 34, for example.

First, an initial value is set to each quality class. Namely, "0" is set to each of the PCR sum totals (SPCR0=0, SPCR1=0 and SPCR2=0), besides "0" is also set to each of the SCR sum totals (SSCR0=0, SSCR1=0 and SSCR2=0) (Step a1).

When setting of a new call is requested by a setup message (YES route at Step a2), if a quality class declared by the setup message is QCB0 ("QCB=0" route at Step a3), a sum total of peak rates of the quality class QCB0 is obtained ("SPCR0=SPCR0+pcr"; Step a4). Namely, a PCR sum total obtained here is a result of adding a PCR sum total set in advance to a PCR of the new call.

After that, by weighting a predetermined value on the PCR sum total having been added PCR of the new call thereto, a total virtual band of the quality class QCB0 is determined ("virtual band 0=SPCR÷0.9"; Step a5). Namely, by weighting, it is possible to determine a virtual band 144M of the quality class QCB0 shown in FIG. 33.

Further, if the desired band is the quality class QCB2 at Step a3 in FIG. 34 ("QCB=2" route at Step a3), a sum total of peak rates of the quality class QCB2 ("SPCR2=SPCR2+pcr; Step a6) is obtained, after that, a total virtual band of the quality class QCB2 is determined ("virtual band 2=SPCR2× 0.05"; Step a7). Namely, by weighting the determined PCR sum total with a predetermined value, it is possible to determine a virtual band 100M of the quality class QCB2 shown in FIG. 33, as well.

If the declared band is the quality class QCB1 at Step a3 in FIG. 34 ("QCB=1" route at Step a3), operation function of the virtual band is classified depending on whether an operation value operated with the maximum value burst size (MBS), a PCR value and an SCR value declared by the setup message is smaller than 500 or not ("MSB×pcr÷scr<500?; Step a8).

Here, depending on whether the obtained operation value is smaller than a predetermined range ("500" in this case) or not, a level of the quality of the quality class QCB1 is divided to be managed (class A or class B) so that different operation manners are applied.

If it is found from a result of the above operation. that the obtained operation value is smaller than 500 (YES route at Step a8), a virtual band is operated as the class A of the quality class QCB1. Namely, a sum total of average rates of the class A is determined ("SSCR1A=SCR1A+scr"; Step a9). Incidentally, an SCR sum total obtained here is a result of adding an SCR sum total of a call (call in the class A of QCB1) set in advance to SCR of the new call.

After that, a predetermined operating process is. conducted on the SCR sum total having been added the SCR of the new call thereto, whereby a total virtual band of the class A of the quality class QCB1 is determined ("virtual band 1A=F1A (SSCR1A); Step a10). In concrete, the following equation is used in the operating process conducted here;

$$F1A(y)=a0+a1*y^\wedge 1+a2*y^\wedge 2+a3*y^\wedge 3+a4*y^\wedge 4+a5*y^\wedge 5 \quad \text{(equation 1)}$$

(where $\wedge$ signifies power)

Coefficients a0 through a5 in the above equation 1 are set on the basis of various parameters (QCB, PCR, SCR, CDV, buffer length or MBS) included in the setup message.

By conducting the above operating process, it is possible to determine a virtual band 90M of the quality class QCB1 shown in FIG. 33, for example.

If it is found from a result of the above operation that the obtained operation value is equal to or larger than 500 (NO route at Step a8), a sum total of average rates in the class B of the quality class QCB1 ("SSCR1B=SSCR1B+scr"; Step a11) is determined. An SCR sum total obtained here is a result of adding an SCR sum total of a call set in advance (call in the class B, in particular) to SCR of the new call.

After that, similarly to the above class A, a predetermined operating process is conducted on the SCR sum total, whereby a total virtual band of the quality class QCB0 is determined ["virtual band 1B=F1B (SSCR1B); Step a12].

In the operating process conducted here, there is used the same equation, excepting only that the coefficients are different from those in the above equation 1. It is possible to determine a virtual band 90M in class B of the quality class QCB1 shown in FIG. 33, for example, through this operating process.

After the above process is conducted, a sum total (whole virtual band) of total virtual bands in the quality classes is determined using the total virtual band in each quality class (whole virtual band=virtual band 0+virtual band 1A+virtual band 1B+virtual band 2; Step a13).

After that, if the whole virtual band obtained as above is smaller than a physical maximum rate of an ATM cell actually inputted (YES route at Step a14), a read rate of each quality class is suitably changed according to a value of the total virtual band already set (Step a15 through a17). If the whole virtual band is above the physical maximum speed (NO route at Step a14), the new call is not accepted (Step a18).

Namely, if the whole virtual band is smaller than the physical maximum rate and the total virtual band is below the read rate (YES route at Step a15), the read rate is not changed and the new call is accepted (Step a16). If the read rate is larger than the total virtual band (NO route at Step a15), a predetermined process to make the read rate larger than at least the total virtual band is conducted, then the new call is accepted. Manners of changing the read rate will be described later.

Capacities (buffer lengths) of the buffers 4b-1 through 4b-4 are fixedly set (capacity of about 10 cells, for example), as stated above. If the virtual band is increased, the buffer length is not dynamically changed but only the read rate is changed, whereby cell congestion is suppressed.

When the above virtual band is updated, parameters such as MBS, cell delay variation, buffer length, etc., are considered. Therefore, these parameters are, at least, (indirectly) considered when the read rate is changed.

In other words, since the total virtual band as the updated virtual band is set as a maximum value of a flowin quantity of cells assumed to flow into the buffers, it is expected to suppress cell congestion if the read rate is larger than at least the total virtual band.

As modes (manners) of controlling the read rates for the buffers 4b-1 through 4b-4 in the above read rate setting control unit 21, there are, in concrete, five modes below [manners; (A) through (E)]:

(A) Mode of taking a read rate from a quality class having the largest vacant band in order In this mode, the read rate setting control unit 21 takes a read rate at a fixed value larger than a deficiency in read rate from a quality class having the largest vacant band among quality classes having vacant bands in order and gives the read rate to a quantity class lacking the read rate so as to conduct a read rate adjusting process. Namely, if a virtual band updated by the virtual band setting unit 20 exceeds a read rate set in advance to the buffer 4b-1, 4b-2, 4b-3 or 4b-4 when a new call occurs, the read rate setting control unit 21 takes a read rate (200 Mbps, 400 Mbps, 600 Mbps, . . . or the upper limit of the vacant band, for example) at a fixed value (a certain rate) larger than a deficiency from a quality class having the largest difference between the read rate and the virtual rate (virtual band).

In this case, a read rate given to the class lacking the read rate is a constant discreet value according to a quantity of the deficiency. If the deficiency is 100 Mbps, a read rate to be given is 200 Mbps. If the deficiency is 300 Mbps, a read rate to be given is 400 Mbps.

If a read rate taken from a quality class having the largest vacant band is insufficient as a required read rate, a read rate at a fixed value is taken from a quality class having the second largest vacant band. If there are a plurality of quality classes having the largest vacant band, a read rate is taken from a class having a smaller quality class identifier number in order.

The above given read rate is not limited to a fixed value larger than the deficiency. It is sufficient that the given read rate is larger than at least the deficiency (exceeds the deficiency). In such case, the read rate is not a constant discreet value. For instance, a read rate given from another quality class may be, not a fixed value larger than a deficiency as above, but a value obtained by adding a rate equivalent to a deficiency to a read rate at a fixed value.

In other words, if a virtual band updated by the virtual band setting unit 20 exceeds a read rate set in advance to the buffer 4b-1, 4b-2, 4b-3 or 4b-4, the above red rate setting control unit 21 may take a rate equivalent to a deficiency and a read rate at a fixed value (200 Mbps, 400 Mbps, 600 Mbps, . . . or the upper limit of the vacant band) from a quality class having the largest vacant band.

Since it is thereby possible to certainly secure an extra (vacant) read rate at a constant value, a quality required by each quality class can be certainly kept.

In this case, if a read rate taken from only a quality class having the largest vacant band is insufficient, it is possible to take a read rate at a fixed value from a quality class having the second largest vacant band, as well. If there are a plurality of quality classes having the larger vacant band, it is possible to take a read rate from a quality class having a smaller quality class identifier number in order.

(B) Mode of taking a read rate equally from vacant bands of other quality classes In the above case (A), a read rate is taken from a quality class having the largest vacant band in order if a deficiency in read rate is generated. However, it is alternatively possible to take a read rate equally from vacant bands of other quality classes.

In concrete, the read rate setting control unit 21 equally divides a read rate at a fixed value larger than a deficiency by the number of quality classes other than a quality class whose updated virtual band is larger than the read rate as other quality classes having vacant bands, and collects a divided rate from each of the other quality classes so as to adjust the read rate.

Namely, if an updated virtual band exceeds a read rate set in advance to the buffer 4b-1, 4b-2, 4b-3 or 4b-4 when a new call occurs, the read rate setting control unit 21 divides a read rate at a fixed value larger than a deficiency (200 Mbps, 400 Mbps, 600 Mbps, . . . or the upper limit of the vacant band) by the number of other quality classes and collects the divided equal read rate from a vacant band of each of the other quality classes.

For instance, if a whole read rate given from other quality classes to a quality-class having a deficiency in read rate is 200 Mbps, a read rate to be given to the quality class having a deficiency in read rate is 200 Mbps/(the number of quality classes−1).

In this case, a read rate to be given is not limited to a fixed value above the deficiency. It is only necessary that the read rate is larger than at least the deficiency. For example, a read rate to be given from other quality classes may be a value obtained by adding a deficient rate and a read rate at a fixed value, not a fixed value larger than a deficiency as above.

In other words, when detecting that a virtual band updated by the virtual band setting unit 20 exceeds a read rate set in advance to the buffer 4b-1, 4b-2, 4b-3 or 4b-4, the read rate setting control unit 21 may divide a read rate obtained by adding a deficiency in read rate to a read rate at a fixed value by the number of quality classes other than a quality class in which a deficiency in read rate is generated, and collect a divided equal read rate from each of the other quality classes.

Whereby, it is possible to secure a constant excessive (vacant) read rate at a fixed value certainly larger than a deficiency similarly to the above case. As a result, it is possible to keep a quality required to each quality class, certainly.

(C) Mode of taking a read rate approximately proportional to a vacant band of each of other quality classes In this mode, when a deficiency in read rate is generated in a quality class, a read rate approximately proportional to a vacant band of each of other quality classes is taken.

In concrete, the read rate setting control unit 21 distributes a read rate at a fixed value larger than a deficiency to quality classes having vacant bands other than a quality class whose updated virtual band is larger than a read rate approximately in proportional to the vacant band of each of the other quality classes and collects each part of the read rate so as to adjust the read rate.

Namely, if a read rate set in advance to the buffer 4b-1, 4b-2, 4b-3 or 4b-4 exceeds an updated virtual band when a new call occurs, the read rate setting control unit 21 distributes a read rate at a fixed value larger than a deficiency (200 Mbps, 400 Mbps, 600 Mbps, . . . or the upper limit of the vacant band) to other quality classes approximately in proportion to a vacant rate of each of the other quality classes, collects the distributed read rate from each of the other classes. In this case, a read rate to be taken is not limited to a fixed value larger than a deficiency, but may be larger than (exceed) at least the deficiency.

For example, a read rate taken from other quality classes may be, not a fixed value larger than a deficiency as above, but a value obtained by adding a deficiency in rate and a read rate at a fixed value.

In other words, when a virtual band updated by the virtual band setting unit 20 exceeds a read rate set in advance to the buffer 4b-1, 4b-2, 4b-3 or 4b-4, the read rate setting control unit 21 may take a read rate approximately in proportion to a vacant band of each of quality classes other than a quality class in which a deficiency in read rate is generated.

Whereby, it is possible to secure a constant excessive (vacant) read rate at a fixed value certainly larger than a deficiency, similarly to the above cases. As a result, a quality required by each quality class can be certainly kept.

(D) Mode of dispersing a vacant band with respect to a busy band of each quality class In this mode, when a deficiency in read rate is generated in a quality class, vacant band of all quality classes are such dispersed that a vacant band is in a certain proportion to a busy band (virtual band) in each quality class.

In concrete, if it is found from a result of comparison by the band comparing unit 21a that there is a quality class whose updated virtual band is larger than a read rate, the read rate setting control unit 21 disperses vacant bands of all quality classes such that a vacant band is in a certain proportion to a busy band in each quality class so as to control the read rates of all the quality classes.

Namely, the read rate setting control unit 21 fixedly sets each of read rates of ATM cells stored in the plural buffers 4b-1 through 4b-4 on the basis of a load of a fixed-length cell in each quality class. If a virtual band of a quality class exceeds a read rate fixedly set when a new call occurs, the read rate setting control unit 21 changes the read rates of all quality classes so that vacant bands of all quality classes are such dispersed that a vacant band is in a certain proportion to a busy band in each quality class.

(E) Mode of managing vacant bands of all quality classes in a pool area.

The vacant band managing unit 21b (refer to FIG. 7) manages vacant bands of all quality classes in the buffer 4b in the pool area, as state before. When setting of a new call is requested, the read rate setting control unit 21 supplies a read rate of a quality class corresponding to the new call on the basis of the vacant bands managed by the vacant band managing unit 21b.

In concrete, a minimum required read rate is set to each of the buffers 4b-1 through 4b-4 at the time of initial operation of the apparatus, and a vacant rate is kept as a pool. When a read rate (QCB read rate) set in advance is smaller than a total virtual band of a quality class calculated on the basis of a request of a new call (connection request), a read rate equivalent to a deficiency is taken out (withdrawn) from the pool area in which the vacant rates (vacant bands) of all quality classes are stored.

Namely, a read rate is taken out from the pool area when a connection request exceeds a read rate of a buffer in a quality class at that time. Incidentally, the pool area can be expressed as "total physical read rate (2.4 Gbps in FIG. 6)—Σtotal virtual band of each quality class".

The call handling processor 2 can change a read rate according to a virtual band of each quality class set when a call is set/released. In other words, a virtual band changed when a new call occurs and a call released is set as a read rate (total virtual band of each quality class=read rate of each quality class).

Further, when setting of a new call is requested, the call handling processor 2 supplies a read rate larger than a virtual band of a quality class which will be increased due to the setting of the new call on the basis of a vacant band. When a vacant band larger than a read rate at a fixed value set in advance is generated due to release of a call, the call handling processor 2 restores a vacant band at a fixed value smaller than the fixed value to the pool area.

In concrete, if a virtual band of a quality class exceeds a read rate of a buffer when a new call occurs, the call handling processor 2 withdraws a read rate at a fixed value larger than a deficiency (100 Mbps, 200 Mbps, 300 Mbps or more, for example) from the pool area. Namely, the read rate is withdrawn from the pool area when a virtual band (total virtual band) updated by the virtual band setting unit 20 upon occurrence of a connection request exceeds a read rate of a quality class, and a fixed value (300 Mbps, for example) larger than a read rate equivalent to the deficiency (250 Mbps, for example) is withdrawn from the pool area.

When a vacant band exceeding a fixed value given from the above pool area is generated in the buffer 4b-1, 4b-2, 4b-3 or 4b-4 of a quality class in which release of a call occurs, the fixed value is restored to the pool area.

Namely, a vacant band is restored to the pool area when a vacant band in the buffer 4b-1, 4b-2, 4b-3 or 4b-4 in a quality class in which release of a connection occurs exceeds a fixed value (300 Mbps, for example) (when a vacant band becomes 350 Mbps, for example). At this time, the vacant band equivalent to the above fixed value (300 Mbps) is restored to the pool area.

The above withdrawal and restoration of a vacant band equivalent to a fixed value from and to the pool area are carried out by software. It is thereby possible to flexibly change a read rate.

An opportunity of restoring a fixed vacant band when a call is released is determined on the basis of whether the vacant band exceeds a value withdrawn from the pool area or not, whereby frequent withdrawal/restoration of a read rate from/to the pool area, that is, vibration is prevented.

When setting of a new call is requested, the call handling processor 2 supplies a read rate at a fixed value larger than a virtual band of a quality class whose read rate will be increased due to the setting of the new call on the basis of a vacant band, similarly to the above case. When a vacant band is generated due to release of the call, the call handling processor 2 can maintain the read rate of the buffer 4b-1, 4b-2, 4b-3 or 4b-4 in a quality class in which a call is released until setting of the next new call is requested, not restoring the vacant band as above.

In concrete, if a virtual band exceeds a read rate in the buffer 4b-1, 4b-2, 4b-3 or 4b-4 in a quality class corresponding to a new call when the new call occurs, the relevant class is given a read rate at a fixed value larger than a deficiency (100 Mbps, 200 Mbsp, 300 Mbps, . . . or more, for example) from the pool area. However, even if a vacant band is generated when the call is released, the vacant band is not restored to the pool area so that the relevant buffer keeps a state (read rate) up to that time. As will be described later, the pool area is in a state where the generated vacant band is assumed to be restored.

When it is necessary to change a read rate due to a request of the next new connection (new call), the corresponding quality class is given a read rate at a fixed value larger than a deficiency from the pool area. At this point of time, read rates of all quality classes are reset to values equivalent to set virtual bands, respectively. Namely, a vacant band generated in a quality class is practically restored to the pool area.

Now, a method of controlling a read rate of an ATM cell in a fixed-length cell handling switching system with the above structure according to this embodiment will be described with reference to a flowchart (Steps S5 and 36) shown in FIG. 9 and a timing diagram (t1 through t6) shown in FIG. 10.

Figure 9:
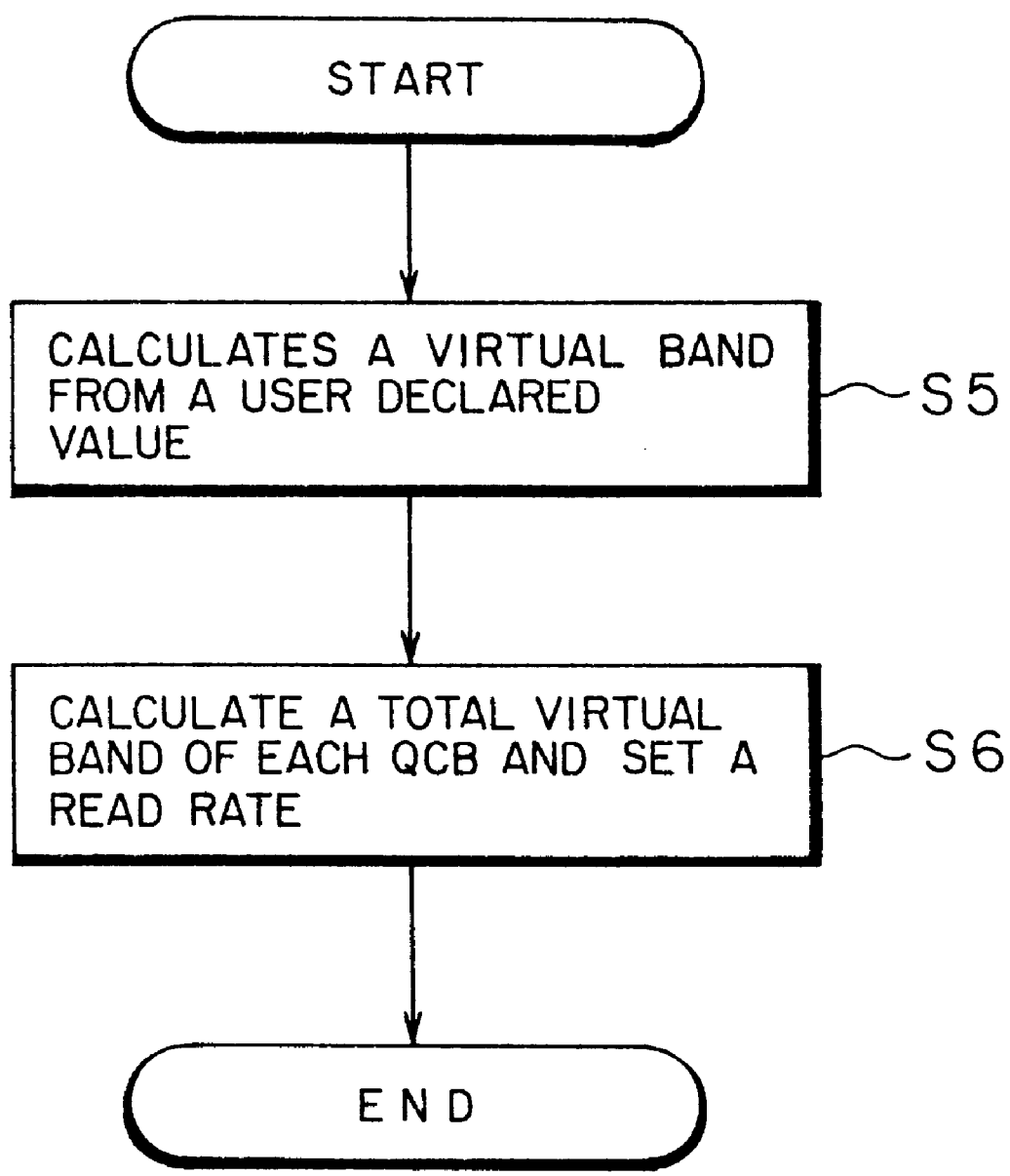
FIG. 9 is a flowchart for illustrating a read rate controlling process by the call handling processor according to the embodiment.
Figure 10:
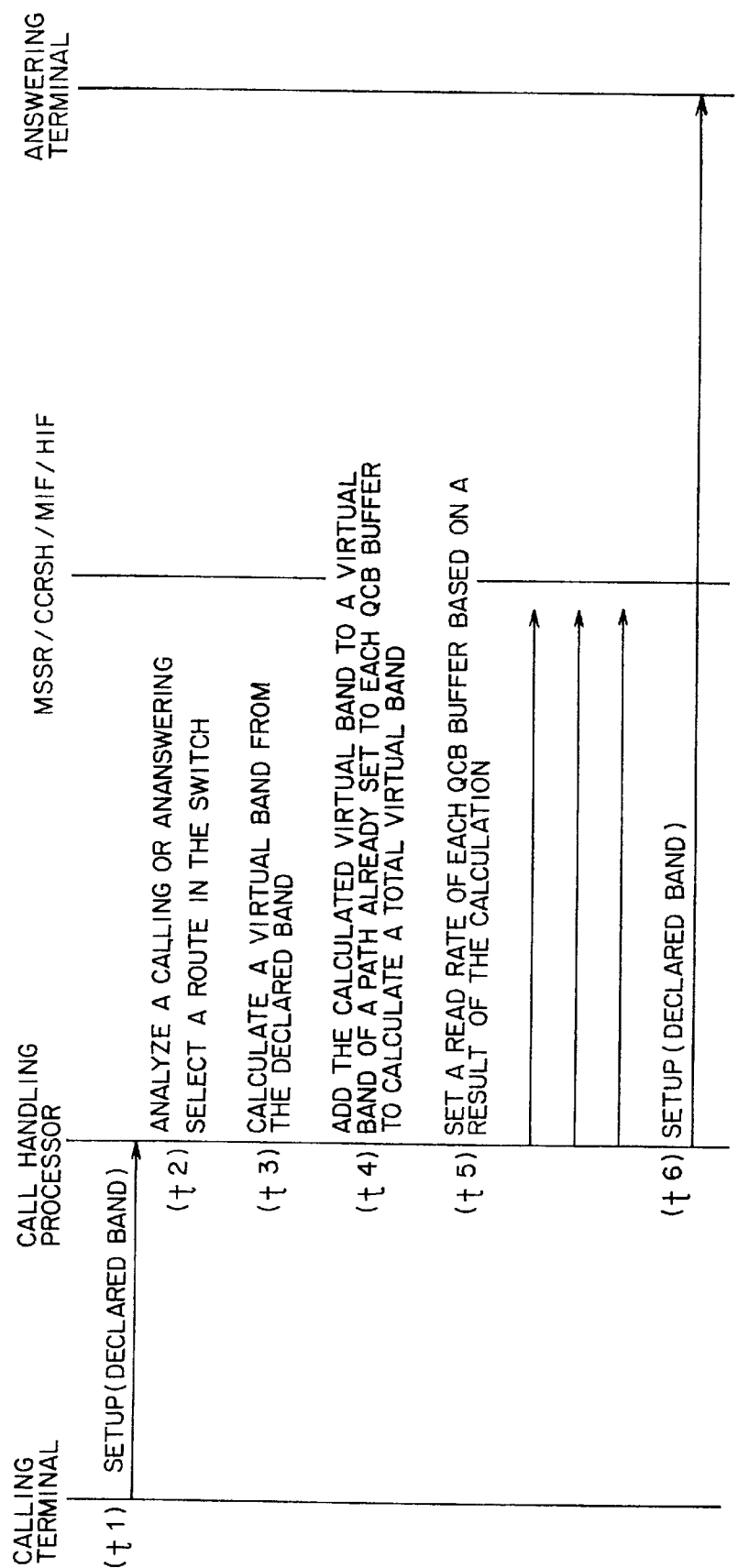
FIG. 10 is a timing diagram for illustrating an operation of call handling in the call handling processor according to the embodiment.

When setting of a new call is requested by a user (a source terminal 5) [setup (setting of a declared band); refer to t1 in FIG. 10], the call handling processor 2 analyzes whether the request is for call originating or call incoming. If the request is for call originating, a route in the ATM switch 13 of the ATM switching system shown in FIG. 6 is selected (refer to t2 in FIG. 10). After that, the virtual band setting unit 20 of the call handling processor 2 calculates a virtual band in a corresponding quality class on the basis of the above declared band (Step S5 in FIG. 9, refer to t3 in FIG. 10).

Namely, a declared band which is a base of a virtual band of a path having been set correspondingly to the quality class QCB0, QCB1, QCB2 or QCB3 is added to the declared value (declared band), and an updated virtual band (total virtual band) is calculated in the corresponding quality class QCB0, QCB1, QCB2 or QCB3 on the basis of a result of the addition (refer to t4 in FIG. 10).

In other words, the quality controlling buffer unit 4 installed in each apparatus (MSSR 13, CCRSH 12, MIF 10A, HIF 11A) in the ATM switching system 1 calculates a total virtual band by adding a declared band which is a base of a present busy band to a declared value (declared band) of a buffer 4b-1, 4b-2, 4b-3 or 4b-4 corresponding to a quality class (QCB0, QCB1, QCB2 or QCB3) declared by the above setup signal.

After that, the read rate setting control unit 21 sets and controls a read rate for an ATM cell held in the QCB read scheduler 4c on the basis of a result of the calculation (Step S6 in FIG. 9, refer to t5 in FIG. 10). The call handling processor 2 then transmits a setup signal to an incoming terminal 5 (refer to t6 in FIG. 10).

The setting of a read rate to a declared band and the control thereon at the above Step S6 maybe done in various manners below.

(A1) Process in the case where a read rate at a fixed value larger than a deficiency from a quality class having the largest vacant band An operation of the call handling processor 2 conducted when taking a read rate at a fixed value larger than a deficiency from a quality class having the largest vacant band will be now described with reference to a flowchart (Step S7 through S10) shown in FIG. 11.

When setting of a new call is requested (declared) by a user, the virtual band setting unit 20 of the call handling processor 2 adds a declared value (declared band) thereof to a declared band which is a base of a virtual band having been set correspondingly to a relevant quality class, and operates (calculates) a total virtual band (Ti; updated virtual band) of the relevant quality class on the basis of a result of the addition (Step S7).

When the total virtual band of each quality class obtained as above is calculated, a sum total (whole virtual band) of the total virtual bands of all quality classes is determined (refer to Step a13 in FIG. 34).

If the whole virtual band is larger than the above physical maximum rate, no new call is accepted (refer to NO route at Step a14 to Step a18 in FIG. 34). If the whole virtual band is smaller than the above physical maximum rate, processes at Steps S8 through S10 in FIG. 11 described below are conducted to accept the new call (refer to YES route at Step a14 to Steps a15 through a17).

Figure 11:
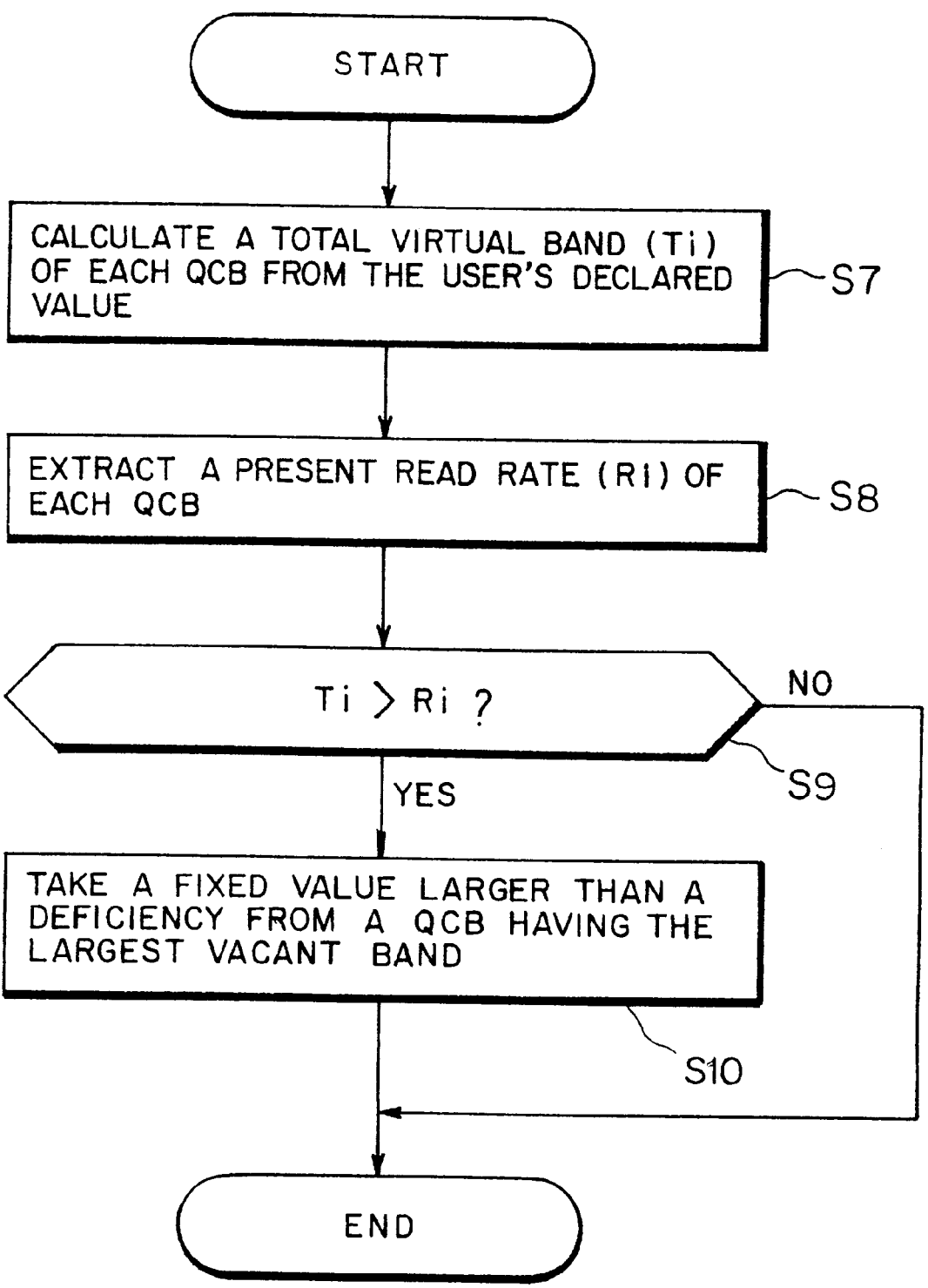
FIG. 11 is a flowchart for illustrating a read rate controlling process by the call handling processor according to the embodiment.

As shown in FIG. 11, the band comparing unit 21a extracts a read rate (Ri) at this point of time (at present) in each quality class (Step S8), and compares the above total virtual band with the present read rate (Ti>Ri) in each quality class (Step S9; similar to Step a15 in FIG. 34).

If it is found from a result of the comparison that there is a quality class whose total virtual band (Ti) is larger than the present read rate (Ri) (YES route at Step S9), the read rate setting control unit 21 takes a read rate at a fixed value larger than a deficiency from a quality class having the largest vacant band by controlling the QCB read scheduler 4c (Step S10). If the total virtual band is smaller than the present read rate in every quality class (NO route at Step S9), the read rate setting control unit 21 does not change the read rate and accepts a new call.

In concrete, assuming here that a declared band 200 Mbps as a new call is declared to the quality class QCB1 in a state where the buffers 4b-1 through 4b-4 possessed by the quality controlling buffer unit 4 having a total read rate 2.4 Gbps are set to a read rate of 600 Mbps with different virtual bands [busy rate (Z)], as shown in FIG. 12(a).

When accepting the new call, the above declared band is added to a declared band which is a base of a virtual band having been set to the quality class QCB1 to calculate a total virtual band of the quality class QCB1 on the basis of a result of the addition.

Here, since the declared band (200 Mbps) due to the new call is added to the declared band [busy rate (Z)=500 Mbps] which is a base of a virtual band of the quality class QCB1, only a total virtual band of the quality class QCB1 is updated to 700 Mbps (total virtual band Ti of the quality class QCB1=700 Mbps).

The total virtual band (Ti=700 Mbps) is then compared with a present read rate of the quality class QCB1 [Ri=600 Mbps; refer to a band A in FIG. 12(a)]. In this case, the total virtual band of the quality class QCB1 is larger than the present read rate of the quality class QCB1 [Ti (700 Mbps) >Ri (600 Mbps)]. Therefore, a read rate at a fixed value [refer to a band B in FIG. 12(b); 200 Mbps is set as a fixed value, here] larger than a deficiency is taken from the quality class QCB0 having the largest vacant band, as shown in FIG. 12(b).

Whereby, the read rates of the quality classes QCB0 and QCB1 are changed. Namely, the read rate of the quality class QCB1 is changed from 600 Mbps to 800 Mbps, the read rate of the quality class QCB0 is changed from 600 Mbps to 400 Mbps, but read rates of the other quality classes QCB2 and QCB3 are not changed.

The fixed-length cell handling switching system 1-1 according to this embodiment can set read rates to respective ATM cells having different qualities according to a quality of each ATM cell and control the read rate. If there is a declaration exceeding a set read rate, it is possible to readily and dynamically change a read rate so as to independently control cell discarding and cell delay for each quality class without affecting cells of calls in different qualities on each other. As a result, switching of an ATM cell that should be transmitted according to a required quality class can be certainly carried out, thus a processing capability of this apparatus is improved.

In the above fixed-length cell handling switching system 1-1, if it is found from a result of comparison of a total virtual band calculated on the basis of a declared band of a new call with a present read rate in a declared quality class that there is a quality class (QCB1) whose total virtual band is larger than a present read rate, the call handling processor 2 as the call handling control unit can take a rate at a fixed value larger than a deficiency in read data from a quality class (QCB0) having the largest vacant band. It is thereby possible to simply move a vacant band (set a read rate), and maintain qualities of quality classes other than the quality class having the largest vacant band without changing the qualities.

Further, the above fixed-length cell handling switching system 1-1 provides a room (vacant band) for a read rate even if the read rate is changed. It is thereby possible to accept a call without changing the read rate when the next call request occurs. As a result, the number of hardware accesses may be decreased, besides a time required to set a call and a load on the call handling processor 2 may be also decreased.

(A2) Process in the case where a deficiency in read rate and a read rate at a fixed value are taken from a quality class having the largest vacant band Now, an operation of the call handling processor 2 when taking a deficiency in read rate and a read rate at a fixed value from a quality class having the largest vacant band will be described with reference to a flowchart (Steps 311 through S14) shown in FIG. 13. Incidentally, detailed description of processes at Steps S11 through S13 shown in FIG. 13 are omitted since they are similar to the processes at Steps S7 through S9 described above shown in FIG. 11.

At Step S13 shown in FIG. 13, a total virtual band (Ti) is compared with a present read rate (Ri). If it is found from a result of the comparison that there is a class whose total virtual band is larger than the current read rate (YES route at Step S13), the read rate setting control unit 21 takes a rate equivalent to a deficiency and a read rate at a fixed value from a quality class having the largest vacant band among other quality classes and gives these rates to the relevant class by controlling the QCB read scheduler 4c (Step S14). If the total virtual band is smaller than the present read rate in every quality class (NO route at Step S13), the read rate setting control unit 21 does not change the read rate and accepts a new call.

In concrete, when a declared band 200 Mbps is declared as a new call to the quality class QCB1 in a state shown in FIG. 14(a), the virtual band setting unit 20 adds the declared band to a declared band which is a base of a virtual band having been set to the quality class QCB1, similarly to the above case, to calculate a total virtual band of the quality class QCB1 on the basis of a result of the addition, compares the bands similarly to the above (A1), and takes a read rate at need.

As shown in FIG. 14(b), the quality class QCB1 is given a deficiency in read rate [100 Mbps; refer to a band B in FIG. 14(b)] and a rate at a fixed value [200 Mbps, here; refer to a band C in FIG. 14(b)] from a quality class having the largest vacant band.

Whereby, read rates of the quality classes QCB0 and QCB1 are changed. Namely, the read rate of the quality class QCB1 is changed from 600 Mbps to 900 Mbps, the read rate of the quality class QCB0 is changed from 600 Mbps to 300 Mbps, but read rates of the quality classes QCB2 and QCB3 are not changed.

In the above fixed-length cell switching system 1-1, if it is found from a result of comparison of a total virtual band calculated on the basis of a declared band of a new call with a present read rate that there is a quality class (QCB1) whose total virtual band is larger than a present read rate, the call handling processor 2 as the call handling control unit takes a deficiency in read rate and a rate at a fixed value from a quality class (QCB0) having the largest vacant band. It is therefore possible to certainly secure a room for the read rate after the read rate is changed, besides decreasing the number of times of hardware accesses, and a time required to set a call and a load on the call handling processor 2 due to the hardware accesses. As a result, a processing capability of this apparatus may be largely improved.

Since a constant excessive (vacant) read rate certainly larger than a deficiency can be secured so that a quality required by each class can be certainly kept.

(B1) Processes in the case where a read rate at a fixed value larger than a deficiency is taken equally from vacant bands of other quality classes.

Now, an operation of the call handling processor 2 when taking a read rate at a fixed value larger than a deficiency equally from vacant bands of other quality classes will be described with reference to a flowchart (Steps S15 through S18) shown in FIG. 15. Incidentally, detailed description of processes at Steps S15 through S17 shown in FIG. 15 is omitted since they are similar to the above-described Steps S7 through S9 shown in FIG. 11.

If it is found from a result of comparison of a total virtual band (Ti) with a present read rate (Ri) conducted at Step S17 shown in FIG. 15 that there is a quality class whose total virtual band is larger than the present read rate (YES route at Step S17), the read rate setting control unit 21 takes a read rate at a fixed value larger than a deficiency equally from vacant bands of other quality classes and gives the read rate to the relevant quality class having the total virtual band larger than the present read rate (Step S18). If a total virtual band is smaller than a read rate in every class (NO route at Step S17), the read rate setting control unit 21 does not change the read rate, and accepts a new call.

For instance, if a declared band 200 Mbps is declared as a new call to the quality class QCB1 in a state shown in FIG. 16(a), the quality class QCB1 is given a read rate at a fixed value [refer to a band B in FIG. 16(b); 300 Mbps is set as a fixed value, here] larger than a deficiency equally (100 Mbps each) from vacant bands of other quality classes QCB0, QCB2 and QCB3, as shown in FIG. 16(b).

Whereby, the read rate of the quality classes QCB0 through QCB3 are changed. Namely, the read rate of the quality class QCB1 is changed from 600 Mbps to 900 Mbps, and read rates of other quality classes QCB0, QCB2 and QCB3 are changed from 600 Mbps to 500 Mbps.

According to the above fixed-length cell handling switching system, if it is found from a result of comparison of a total virtual band calculated on the basis of a declared band of a new call with a present read rate that there is a quality class (QCB1) whose total virtual band is larger than the present read rate, the call handling processor 2 as the call handling control unit takes a read rate at a fixed value larger than a deficiency in read rate equally from other quality classes (QCB0, QCB2 and QCB3) other than the relevant quality class so that the read rate in each of the other classes is not largely decreased. It is therefore possible for each quality classes to keep the qualities close to those obtained before the change of the read rate.

(B2) Process in the case where a read rate equivalent to a deficiency and a read rate at a fixed value are taken equally from vacant bands of other quality classes Next, an operation of the call handling processor 2 when taking a read rate obtained by adding a read rate equivalent to a deficiency to a read rate at a predetermined fixed value equally from other quality classes will be described with reference to a flowchart (Steps S19 through S22) shown in FIG. 17. Incidentally, detailed description of processes at Steps S19 through S21 in FIG. 17 is omitted. since they are similar to the above-described processes at Steps S7 through S9 in FIG. 11.

Here, if it is found from a result of comparison of a total virtual band (Ti) with a present read rate (Ri) at Step S21 in FIG. 17 that there is a class whose total virtual band is larger than the present read rate (YES route at Step S21), the read rate setting control unit 21 takes a deficiency in read rate and a read rate at a fixed value equally from other quality classes and gives them to a relevant quality class in which the deficiency in read rate is generated by controlling the QCB read scheduler 4c (Step S22). If the total band is smaller than the present read rate in every quality class (NO route at Step S21), the read rate setting control unit 21 does not change the read rate, and accepts a new call.

In concrete, if a declared band 200 Mbps is declared as a new call to the quality class QCB1 in a state shown in FIG. 18(a), the quality class QCB1 is given a read rate (300 Mbps in total) obtained by adding a deficiency in read rate [100 Mbps; refer to a band B in FIG. 18(b)] to a rate at a fixed value [200 Mbps, here; refer to a band C in FIG. 18(b)] equally (100 Mbps each) from other quality classes (QCB0, QCB2 and QCB3), as shown in FIG. 18(b).

Whereby, the read rate of each quality class is changed. Namely, the read rate of the quality class QCB1 is changed from 600 Mpbs to 900 Mbps, and the read rates of other quality classes QCB0, QCB2 and QCB3 are changed from 600 Mbps to 500 Mbps.

According to the above fixed-length cell handling switching system 1-1, if it is found from a result of comparison of a total virtual band calculated on the basis of a declared band of a new call with a read rate at present that there is a quality class (QCB1) whose total virtual band is larger than the present read rate, the call handling processor as the call handling control unit takes a deficiency in read rate and a rate at a fixed value equally from other quality classes (QCB0, QCB2 and QCB3) and gives them to the relevant quality class (QCB1). In this case, the read rate is not largely decreased in each of the other quality classes, as well. It is therefore possible to maintain qualities close to those obtained before the change of the read rates.

Further, it is possible to secure a constant extra (vacant) read rate certainly larger than a deficiency so that a quality required by each quality class may be certainly kept.

(C1) Process in the case where a read rate larger than a deficiency is taken approximately in proportion to a vacant band of each of other quality classes Now, an operation of the call handling processor 2 when taking a read rate at a fixed value larger than a deficiency approximately in proportion to a vacant band of each of other quality classes will be described with reference to a flowchart (Steps S23 through S26) shown in FIG. 19. Incidentally, detailed description of processes at Steps S23 through S25 shown in FIG. 19 is omitted since they are similar to the above-described processes at Steps S7 through 39 shown in FIG. 11.

Figure 29:
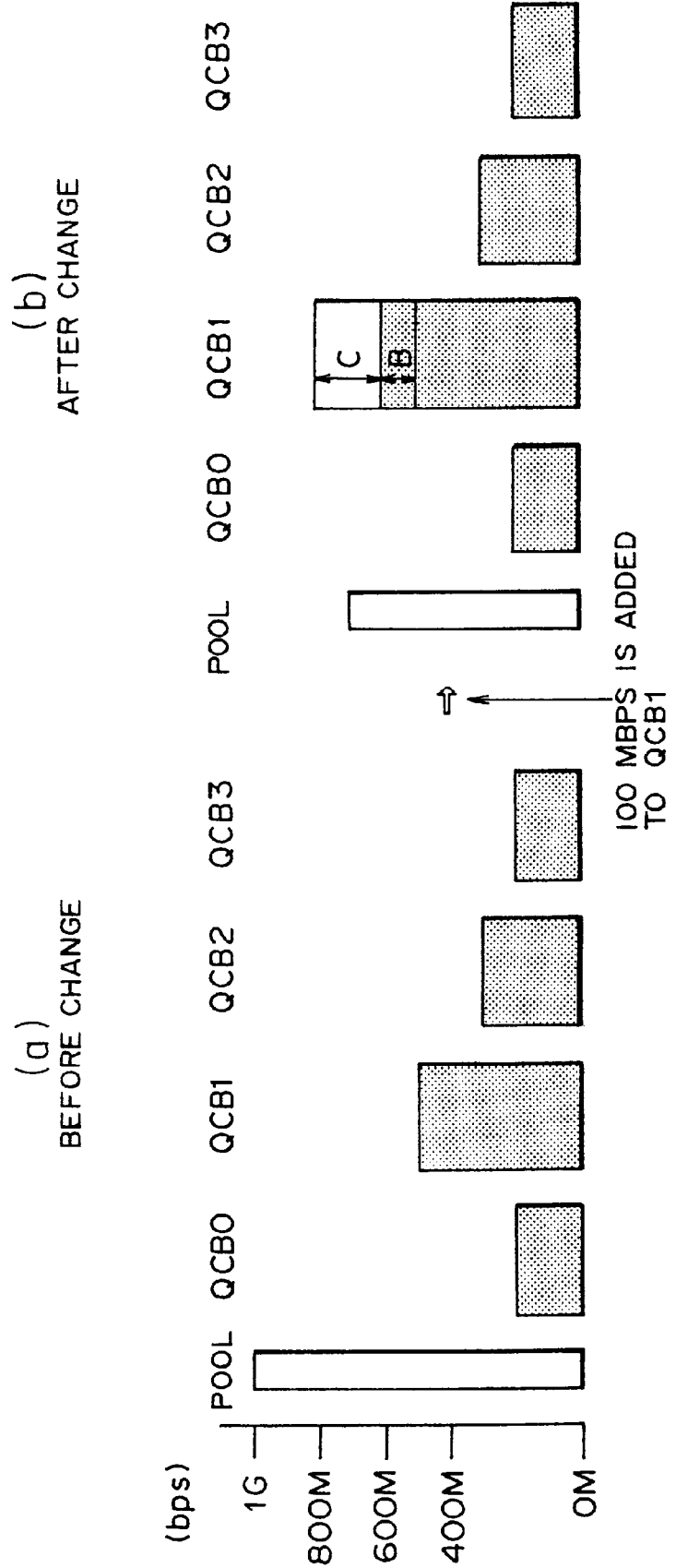

Namely, it is found from a result of comparison of a total virtual band (Ti) with a read rate at present (Ri) at Step S25 in FIG. 29 that there is a quality class whose total virtual band is larger than the present read rate (YES route at Step S19), the read rate setting control unit 21 distributes a read rate at a fixed value larger than a deficiency approximately in proportion to a vacant band of each of quality classes other than a relevant quality class in which a deficiency in read rate occurs, and collects each part of the read rate from each of the other quality classes by controlling the QCB read scheduler 4c (Step S26). If the total virtual band is smaller than the present read rate in every class (NO route at Step S25), the read rate control setting unit 21 does not change the read rate, and accepts a new call.

In concrete, if a declared band 200 Mbps is declared as a new call to the quality class QCB1 in a state shown in FIG. 20(a), the quality class QCB1 is given each part of a read rate at a fixed value larger than a deficiency [300 Mbps, here; refer to a band B in FIG. 20(b)] approximately in proportion to a vacant band of a quality class, as shown in FIG. 20(b).

Here, since the quality class QCB1 is given each part of the read rate approximately in proportion to a vacant band of each of other quality classes, the quality class QCB1 is given 100 Mbps form the quality class QCB0 whose vacant band is 400 Mbps, 200 Mbps from the quality class QCB3 whose vacant band is 500 Mbps, totaling 300 Mbps. Therefore, a read rate of the quality class QCB1 is changed from 600 Mbps to 900 Mbps. With this, a read rate of the quality class QCB0 is changed to 500 Mbps, a read rate of the quality class QCB3 is changed to 400 Mpbs, but a read rate of the quality class QCB2 is not changed and still remains at 600 Mbps.

According to the above fixed-length cell handling switching system 1-1, if it is found from a result of comparison of a total virtual band calculated on the basis of a declared band of a new call with a read rate at present that there is a quality class (QCB1) whose total virtual band is larger than the present read rate, the call handling processor 2 as the call handling control unit takes each part of a read rate at a fixed value larger than a deficiency approximately in proportion to a vacant band of a quality class from eachof quality classes (QCB0, QCB2 andQCB3) other than the relevant quality class. It is therefore possible to impartially secure a vacant band in each of the quality classes.

(C2) Process in the case where a read rate equivalent to a deficiency and a read rate at a fixed value are taken approximately in proportion to a vacant band of each of other quality classes Now, description will be made of an operation of the call handling processor 2 when taking each part of a read rate obtained by adding a deficiency in read rate to a read rate at a fixed value approximately in proportion to a vacant band of each of other quality classes, with reference to a flowchart (Steps S27 through S30) shown in FIG. 21. Incidentally, detailed description of processes at Steps S27 through S29 is omitted since they are similar to the above-described processes at Steps S7 through S9 shown in FIG. 11.

Here, if it is found from a result of comparison of a total virtual band (Ti) with a present read rate (Ri) at Step S29 in FIG. 21 that there is a quality class whose total virtual band is larger than the present read rate (YES route at Step S29), the read rate setting control unit 21 distributes a read rate obtained by adding a deficiency in read rate to a rate at a predetermined fixed value approximately in proportion to a vacant band of a quality class to collect each part of the read rate from each of other quality classes, and gives the read rate to the relevant quality class by controlling the QCB read scheduler 4c (Step S30). If the total virtual band is smaller than the present read rate in every quality class (NO route at Step S29), the read rate setting control unit 21 does not change the read rate, and accepts a new call.

For instance, if a declared band 200 Mbps is declared as a new call to the quality class QCB1 in a state shown in FIG. 22(a), the quality class QCB1 is given each part of a read rate which is a sum of a deficiency in read rate [100 Mbps; refer to a band B in FIG. 22(b)] and a rate at a fixed value [200 Mbps, here; refer to a band C in FIG. 22(b)] from each of other quality classes, as shown in FIG. 22(b).

Whereby, the read rates of the quality classes QCB0, QCB2 and QCB3 are changed. In this case, the read rate of the quality class QCB1 is changed from 600 Mbps to 900 Mbps, the read rates of the quality classes QCB0 and QCB3 are changed to 500 Mbps and 400 Mbps, respectively, but the read rate of the quality class QCB2 is not changed, thus remains at 600 Mbps.

According to the above fixed-length cell handling switching system 1-1, if it is found from a result of comparison of a total virtual band calculated on the basis of a declared band of a new call with a read rate at present that there is a quality class (QCB1) whose total virtual band is larger than the present read rate, the call handling processor 2 as the call handling control unit collects each part of a read rate obtained by adding a deficiency in read rate and a read rate at a fixed value approximately in proportion to a vacant band of a quality class from each of quality classes (QCB0, QCB2 and QCB3) other than the relevant quality class. In this case, it is possible to impartially secure a vacant band in each of the quality classes.

It is also possible to secure a constant extra (vacant) read rate larger than a deficiency so that a quality required by each quality class is certainly kept.

(D) Process in the case where a vacant band is dispersed with respect to a busy band of each quality class Description will be now made of an operation of the call handling processor 2 in the case where vacant bands are such dispersed that each vacant band is in a certain proportion to a total virtual band calculated in each quality class, with reference to a flowchart (Steps S31 through S34) shown in FIG. 23. Incidentally, detailed description of processes at Steps S31 through S33 is omitted since they are similar to the above-described Steps S7 through S9 shown in FIG. 11.

If it is found from a result of comparison of a total virtual band (Ti) with a read rate (Ri) at present at Step S33 shown in FIG. 23 that there is a quality class whose total virtual band is larger than the present read rate (if there is no vacant band satisfying a corresponding quality class) (YES route at Step S33), the read rate setting control unit 21 disperses vacant bands to quality classes QCB0 through QCB3 such that each of the vacant bands is in a certain proportion to a total virtual band (a busy band) in each of the quality classes by controlling the QCB read scheduler 4c, thereby changing the read rate (Step S34). If the total virtual band is smaller than the read rate in every class (NO route at Step S33), the read rate setting control unit 21 does not change the read rate, and accepts a new call.

For instance, if a declared band 200 Mbps is declared as a new call to a quality class QCB1 in a state shown in FIG. 24(a), vacant bands are dispersed in the quality classes QCB0 through QCB3 approximately in proportion to respective total virtual bands of the quality classes QCB0 through QCB3 as shown in FIG. 24(b).

According to the above fixed-length cell handling switching system 1-1, if it is found from a result of comparison of a total virtual band calculated on the basis of a declared band of a new call with a read rate at present in each quality class that there is a quality class (QCB1) whose total virtual band is larger than the present read rate, the call handling processor 2 as the call handling control unit disperses vacant bands in all quality classes (QCB0 through QCB3) approximately in proportion to respective total virtual bands so that a quality of each quality class can be certainly secured without deviation.

The fixed-length cell handling switching system 1-1 according to this embodiment operates as described in detail in the above items (A) through (D). If there is a quality class whose updated virtual band (total virtual band) is larger than a read rate, the above fixed-length cell handling switching system 1-1 increases the read rate assigned to the relevant quality class, while decreasing read rates assigned to other quality classes having vacant bands, thereby adjusting the read rates. It is thereby possible to certainly secure a quality requiredby relevant quality class, thus largely contribute to flexibility when the system is configured.

(E1) Process in the case where vacant bands of quality classes are managed in a pool area, and a read rate is changed according to a setup/release of a call Now, description will be made of a case where vacant bands of all quality classes are managed in a pool area, and a read rate is changed according to a total virtual band of a quality class set when a call is set and released, with reference to a flowchart (Steps S35 through S44) shown in FIGS. 25, 27 and 28.

When setting of a new call is requested (declared) by a user, as shown in the flowchart in FIG. 25, the call handling processor 2 adds the declared band and a declared band which is a base of a virtual band having been set to a relevant quality class to calculate a total virtual band (Ti) of the relevant quality class on the basis of a result of the addition (Step S35). Then, the total virtual band (Ti) determined as above is set as a read rate of each quality class (Step S36).

For instance, a virtual band is set to each quality class as shown in FIG. 26(a). If a quality class QCB1 is declared additional 100 Mbps in a state where vacant bands of all quality classes are managed in the pool area (1 Gbps, for example), 100 Mbps which is equivalent to the declared read rate is withdrawn from the pool area, and given to the quality class QCB1 as shown in FIG. 26(b).

When a call is released, the vacant band is not restored to the pool area until a vacant band larger than a read rate at a predetermined fixed value is generated.

Namely, a vacant band may be generated in a quality class in which release of a call occurs although a vacant band in common to all quality classes is managed in the pool area. In such case, when a call occurs in the relevant quality class, a read rate is adjusted in consideration of the vacant band having been generated in the quality class.

This will be described with reference to a flowchart (Steps S37 through S40 and Steps S41 through S44) shown in FIGS. 27 and 28. Incidentally, detailed description of processes at Steps S37 through S39 in FIG. 27 is omitted since they are similar to the above-described processes at Steps S7 through S9 in FIG. 11.

Here, if it is found from a result of comparison of a total virtual band (Ti) with a read rate (Ri) at present at Step S39 in FIG. 27 that there is a quality class whose total virtual band is larger than the present read rate (YES route at Step S39), the read rate setting control unit 21 withdraws a read rate (Wi) at a fixed value larger than a deficiency from a vacant band pool by controlling the QCB read scheduler 4c (Step S40). If the total virtual band is smaller than the present read rate in every quality class (NO route at Step S39), the read rate setting control unit 21 does not change the read rate, and accepts a new call.

In concrete, a virtual band is set to each quality class as shown in FIG. 29(a). If the quality class QCB1 is declared additional 100 Mbps in a state where vacant bands of all quality classes are managed in the pool area (1 Gbps, for example), 100 Mbps [refer to a band B in FIG. 29(b)] equivalent to the declared read rate and a fixed read rate [a fixed value=200 Mbps, for example; refer to a band C in FIG. 29(b)] are withdrawn from the pool area, and given to the quality class QCB1.

When a call is released, a virtual band is calculated on the basis of a declared band of a path which will be released, a total virtual band (Ti) of each of the quality classes QCB0 through QCB3 is calculated (Step S41), then a vacant band (Vi) of each of the quality classes QCB0 through QCB3 is calculated (Step S42), as shown in FIG. 28.

After that, if it is found from a result of comparison of the calculated vacant band (Vi) with a predetermined fixed value (Ui; 300 Mbps, for example) that the vacant band (Vi) is larger than the fixed value (Ui) (NO route at Step S43), the read rate setting control unit 21 controls the QCB read scheduler 4c to restore the fixed value (Wi) having been withdrawn from the pool area to the pool area (Step S44). If the vacant band (Vi) is smaller than the fixed value (Ui) in every quality class (YES route at Step S43), the read rate setting control unit 21 does not restore the fixed value (Wi) to the pool area.

For instance, if the quality class QCB1 is declared release of 150 Mbps in a state where a vacant (refer to a band C) of the quality class QCB1 after the read rate is changed is 200 Mbps, the vacant band of the quality class QCB1 becomes 350 Mbps (Vi), as shown in FIG. 29(b). Namely, a vacant band larger than the fixed value (Ui=300 Mbps) is generated in the quality class QCB1 so that the fixed value (Wi=200 Mbps) having been withdrawn from the pool area is restored to the pool area.

According to the above fixed-length cell handling switching system 1-1, the call handling processor 2 as the call handling control unit changes a read rate according to a virtual band of a quality class set when a call is set/released. Therefore, it is only necessary to withdraw a read rate for a quality class corresponding to a call out request upon call out to change the read rate so that a process to move a band among the buffers 4b-1 through 4b-4 may be simplified. As a result, it is possible to quickly carry out a read rate controlling process in the apparatus.

In concrete, according to the above fixed-length cell handling switching system 1-1, the call handling processor 2 as the call handling control unit withdraws a read rate equivalent to a declared band and a read rate at a fixed value from the pool area on the basis of the declared band of a new call, whereas if a vacant band at a fixed value is generated due to release of a call, restoring a read rate at a fixed value smaller than the vacant band at the fixed value to the pool area. It is therefore possible to always secure a vacant band in the pool area so as to cope with a new call request promptly. In this case, the read rate controlling process may be carried out quickly, as well.

(E2) process in the case where vacant bands of quality classes are managed in the pool area and a read rate is not changed even if a vacant band is generated upon release of a call Description will be now made of a case where even if a vacant band is generated due to release of a call, a read rate of a buffer in a relevant quality class is maintained until setup of the next new call is requested.

For instance, if the quality class QCB1 (whose read rate is 500 Mbps) is declared additional 100 Mbps in a state where a virtual band is set to each quality class and a whole vacant band of all quality classes is managed in the pool. area (1 Gbps, for example), as shown in FIG. 30(a), the declared 100 Mbps [refer to a band B in FIG. 30(b)] and a read rate at a fixed value [for example, a fixed value=200 Mbps; refer to a band C in FIG. 30(b)] are withdrawn from the pool area and given to the quality class QCB1 so that the read rate of the quality class QCB1 becomes 800 Mbps, as shown in FIG. 30(b).

After that, if a vacant band 200 Mbps is generated in the quality class QCB1 due to release of a call, for example, a vacant band of 400 Mbps [refer to a band B in FIG. 31(a)] is newly generated. However, the read rate of the quality class QCB1 is not changed and remains at 800 Mbps as shown in FIG. 31(a) until setup of a new call is requested, and this state is kept. At this time, the software assumes that the vacant band 400 Mbps [refer to a band C in FIG. 31(a)] is restored from the quality class QCB1 to the pool area.

If the quality class QCB0 is newly declared 100 Mbps in the above state, the vacant band 400 Mbps left in the quality class QCB1 is restored to the pool area, and the quality class QCB0 is given the declared 100 Mbps [refer to a band B in FIG. 31(b)] and a read rate at a fixed value [200 Mbps, for example, refer to a band C in FIG. 31(b)] from the pool area.

According to the above fixed-length cell handling switching system 1-1, the call handling processor 2 as the call handling control unit maintains a read rate of the buffer 4b-1, 4b-2, 4b-3 or 4b-4 in a quality class in which a call is released until setup of the next new call is requested even if a vacant band is generated when the call is released. In consequence, it is only necessary to activate the call handling processor 2 upon setup of a call so that a power consumption of the apparatus is largely saved.

The fixed-length cell handling switching system 1-1 according to this embodiment can set and control a read rate according to a quality of each of ATM cells having different qualities. Even if receiving a declaration larger than a read rate having been set, the fixed-length cell handling switching system 1-1 can readily and dynamically change the read rate, and independently control cell discarding and cell delay in each class without affecting cells of calls having different quality classes on each other. It is therefore possible to certainly switch an ATM cell to be transmitted according to a required quality class. As a result, a processing capability of this apparatus may be largely improved.

(F) Others

Having been described a controlling method used when a read rate set in advance to each quality class is changed upon a request of a new call in the above embodiment, it is alternatively possible that a read rate is fixedly set to each quality class, and if a total virtual band of a quality class to which a virtual band calculated on the basis of a declared band is added is smaller than a read rate set in advance to a fixed value when a new call occurs, an ATM cell of the relevant quality class is accepted, or if the total virtual band of a quality class exceeds the read rate set. in advance to the fixed value, the ATM cell of the relevant quality class is not accepted.

In concrete, more detailed description of this will be now described with reference to a flowchart (Step S45 through S49) shown in FIG. 32. When setup of a new call is requested (declared) by a user (setup of a declared band), a virtual band of a corresponding quality class is calculated (Step S45). After that, a total virtual band of each of quality classes QCB0 through QCB3 is calculated, and a read rate of each of the quality classes held in the read rate information holding unit 4c is extracted by the read rate setting control unit 21 (Step S46).

At this time, it is determined whether the total virtual band of each of the quality classes is smaller than the read rate (Step S47). If it is found from a result of the determination that the total virtual band is smaller than the read rate (YES route at Step S47), an ATM cell of a relevant quality class is accepted (Step S48). If the total virtual band exceeds the read rate (NO route at Step S47), an ATM cell of the relevant quality class is not accepted (Step S49).

Since the read rate is set in advance to a fixed value as above, it is unnecessary to change the read rate according to a call request. It is thereby possible to transmit an ATM cell having a required quality in each quality class at all times.

What is claimed is:

1. A fixed-length cell handling switching system having a call handling control unit for controlling call handling when communication is made using a fixed-length cell comprising:

a quality class identifier relating unit for relating a quality class identifier according to a quality class of said fixed-length cell;

a quality controlling buffer unit having a managing unit for managing the fixed-length cell related to said quality class identifier on the basis of said quality class identifier, a buffer for storing said fixed-length cell managed by said managing unit, and a read rate information holding unit for holding information about a read rate of said fixed-length cell stored in said buffer;

said call handling control unit comprising:

a virtual band setting unit for setting a virtual band in said buffer on the basis of said quality class and a declared band in a call presently set; and a read rate setting control unit for setting and controlling a read rate of the fixed-length cell held in said read rate information holding unit on the basis of said virtual band set by said virtual band setting unit.

2. The fixed-length cell handling switching system according to claim 1, wherein said quality controlling buffer unit is provided in a position where fixed-length cell congestion may occur.

3. The fixed-length cell handling switching system according to claim 1, wherein said virtual band setting unit adds a declared band declared when setup of a new call is requested to a declared band which is a base of said virtual band having been set to said quality class to operate a virtual band updated on the basis of a result of the addition; and said read rate setting control unit has a band comparing unit for comparing a read rate of the fixed-length cell stored in said buffer correspondingly to a quality class at present with said updated virtual band fed from said virtual band setting unit to control the read rate of said fixed-length cell on the basis of a result of the comparison by said band comparing unit.

4. The fixed-length cell handling switching system according to claim 3, wherein if it is found from a result of the comparison by said band comparing unit that there is a quality class in which said updated virtual band is larger than said read rate, said read rate setting control unit increases said read rate assigned to said quality class, while decreasing said read rates assigned to other quality classes having vacant bands to conduct a read rate adjusting process.

5. The fixed-length cell handling switching system according to claim 3, wherein if it is found from a result of the comparison by said band comparing unit that there is a quality class in which said updated virtual band is larger than said read rate, said read rate setting control unit sets and controls said read rates for all of said quality classes so that vacant bands are such dispersed that a vacant band is in a certain proportion to a busy band in each of said quality classes.

6. The fixed-length cell handling switching system according to claim 1, wherein said read rate setting control unit has a vacant band managing unit for managing a vacant band of said buffer in each quality class in a pool area, and when setup of a new call is requested said read rate setting control unit supplies a read rate of a quality class corresponding to said new call on the basis of said vacant band managed by said vacant band managing unit.

7. The fixed-length cell handling switching system according to claim 3, wherein said read rate setting control unit supplies a read rate larger than a deficiency in read rate of the fixed-length cell stored in said buffer corresponding to a present quality class of said updated virtual band set by said virtual band setting unit.

8. The fixed-length cell handling switching system according to claim 7, wherein said read rate setting control unit supplies a read rate larger by a predetermined read rate than a deficiency in read rate of the fixed-length cell stored in said buffer corresponding to a present quality class of said updated virtual band set by said virtual band setting unit.

9. A fixed-length cell handling switching system comprising:
   a quality class identifier relating unit for relating a quality class identifier to a fixed-length cell flowing in through a route of a set call on the basis of a quality class and a declared band when said call is set;
   a managing unit for managing a route of said fixed-length cell inputted from said quality class identifier relating unit on the basis of said quality class identifier related by said quality class identifier relating unit;
   a buffer for storing said fixed-length cell managed by said managing unit; and
   a read rate setting control unit for setting a virtual band of said buffer on the basis of said quality class and said declared band and controlling a read rate for said fixed-length cell held in said buffer on the basis of said virtual band.

10. A method for controlling a read rate of a fixed-length cell stored in a buffer on the basis of a quality class of communication from said buffer comprising the steps of:
    a virtual band setting step to set a virtual band of said buffer on the basis of said quality class and a declared band;
    a quality class identifier relating step to relate a quality class identifier to a fixed-length cell flowing in through a route of a set call on the basis of said quality class of the communication and said declared band declared when said call is set;
    a buffer storing step to manage said fixed-length cell related to said quality class identifier on the basis of said quality class identifier and store said fixed-length cell in said buffer; and
    a reading step to read said fixed-length cell stored in said buffer at a read rate determined on the basis of said virtual band.

11. The method for controlling a read rate of a fixed-length cell according to claim 10, wherein said read rate of said fixed-length cell stored in said buffer is fixedly set in advance on the basis of a load of said fixed-length cell in each of said quality class at said virtual band setting step, and if said virtual band of said quality class exceeds said read rate fixedly set when a new call occurs, said read rate assigned to said quality class is increased to a read rate larger than a deficiency in read rate, whereas said read rates assigned to other quality classes having vacant bands are decreased at said reading step so that said read rate is adjusted.

12. The method for controlling a read rate of a fixed-length cell according to claim 10, wherein said read rate of said fixed-length cell stored in said buffer is fixedly set in advance on the basis of a load of said fixed-length cell in each of said quality class at said virtual band setting step, and if said virtual band of said quality class exceeds said read rate fixedly set when a new call occurs, read rates of all quality classes are changed so that vacant bands are such dispersed that a vacant band is in a certain proportion to a busy band in each of said quality classes at said reading step.

13. The method for controlling a read rate of a fixed length cell according to claim 10, wherein vacant bands in said buffer of all quality classes are managed in a pool area, and said read rate at said reading step is changed according to a virtual band of a relevant quality class set when said call is set or released at said virtual band setting step.

14. The method for controlling a read rate of a fixed-length cell according to claim 10, wherein vacant bands in said buffer of all quality classes are managed in a pool area, and when setting of a new call is requested, a read rate at a fixed value larger than a virtual band of a relevant quality class which will be increased due to the setting of said new call is supplied on the basis of said virtual bands at said reading step, whereas if a vacant band larger than a read rate at a fixed value set in advance is generated due to release of a call, a vacant band at said fixed value is restored to said pool area.

15. The method for controlling a read rate of a fixed-length cell according to claim 10, wherein vacant bands in said buffer of all said quality classes are managed in a pool area, and when setting of a new call is requested, a read rate at a fixed value larger than a virtual band of a relevant quality class which will be increased due to the setting of said new call is supplied on the basis of said vacant bands at said reading step, and even if a vacant band is generated due to release of a call, a read rate of a quality class in which said call is released is maintained until setup of the next new call is requested.

16. The method for controlling a read rate of a fixed-length cell according to claim 11, wherein a read rate at a fixed value larger than a deficiency in read rate is adjusted in order with a quality class having the largest vacant band as said other quality class having said vacant band.

17. The method for controlling a read rate of a fixed-length cell according to claim 11, wherein a read rate obtained by adding a deficiency in read rate and a read rate at a fixed value is adjusted in order with a quality class having the largest vacant band as said other quality class having a vacant band.

18. The method for controlling a read rate of a fixed-length cell according to claim 11, wherein a read rate at a fixed value larger than a deficiency in read rate is equally distributed so as to be adjusted with quality classes other than said quality class as said other quality classes having vacant bands.

19. The method for controlling a read rate of a fixed-length cell according to claim 11, wherein a read rate obtained by adding a deficiency to a read rate at a fixed value is equally distributed so as to be adjusted with quality classes other than said quality class as said other quality classes having vacant bands.

20. The method for controlling a read rate of a fixed-length cell according to claim 11, wherein a read rate at a fixed value larger than a deficiency in read rate is distributed in proportion to a vacant rate of each quality class so as to be adjusted with quality classes other than said quality class as said other quality classes having vacant bands.

21. The method for controlling a read rate of a fixed-length cell according to claim 11, wherein a read rate obtained by adding a deficiency to a read rate at a fixed value is distributed in proportion to a vacant band of each quality class so as to be adjusted with quality classes other than said quality class as said other quality classes having vacant bands.

* * * * *

UNITED STATES PATENT AND TRADEMARK OFFICE
CERTIFICATE OF CORRECTION

PATENT NO. : 6,185,186 B1  
DATED : February 6, 2001  
INVENTOR(S) : Yoshihiro Watanabe Page 1 of 1

It is certified that error appears in the above-identified patent and that said Letters Patent is hereby corrected as shown below:

Title page, item [30],
Please correct the Foreign Application Priority Data by omitting -- 9-102208, April 18, 1997, JAPAN.-- Also please add -- 08-256156, OCTOBER 1, 1996, JAPAN, and 04-207453, JULY 29, 1992, JAPAN to the Reference Cited Section. --

Signed and Sealed this

Twenty-third Day of October, 2001

Attest:

*Nicholas P. Godici*

NICHOLAS P. GODICI  
*Acting Director of the United States Patent and Trademark Office*

*Attesting Officer*